(12) United States Patent
Nakamori et al.

(10) Patent No.: US 9,325,462 B2
(45) Date of Patent: Apr. 26, 2016

(54) USER EQUIPMENT, BASE STATION DEVICE, AND MOBILE COMMUNICATION METHOD

(75) Inventors: Takeshi Nakamori, Yokohama (JP); Hiroyuki Ishii, Yokohama (JP); Hiromasa Umeda, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 138 days.

(21) Appl. No.: 13/500,029

(22) PCT Filed: Oct. 6, 2010

(86) PCT No.: PCT/JP2010/067573
§ 371 (c)(1),
(2), (4) Date: Jun. 6, 2012

(87) PCT Pub. No.: WO2011/043394
PCT Pub. Date: Apr. 14, 2011

(65) Prior Publication Data
US 2012/0243429 A1    Sep. 27, 2012

(30) Foreign Application Priority Data
Oct. 6, 2009 (JP) .................................. 2009-232906

(51) Int. Cl.
*H04L 12/26*  (2006.01)
*H04B 3/46*   (2015.01)
(Continued)

(52) U.S. Cl.
CPC ............... *H04L 5/001* (2013.01); *H04L 5/143* (2013.01); *H04J 11/0023* (2013.01); *H04L 1/20* (2013.01);
(Continued)

(58) Field of Classification Search
CPC ..... H04W 72/00; H04W 88/02; H04W 88/08; H04W 24/10; H04L 5/001; H04L 1/20; H04L 5/0044; H04L 5/0048; H04L 5/0055; H04L 5/0082; H04L 5/0094; H04L 5/143
USPC ......... 455/67, 574, 450, 115.3; 370/318, 329, 370/280, 465, 252, 232; 375/285, 141, 225
See application file for complete search history.

(56) References Cited

U.S. PATENT DOCUMENTS 6,597,668 B1 *   7/2003  Schafer et al. ................. 370/280
2005/0185733 A1 * 8/2005  Tolli et al. ..................... 375/285
(Continued)

FOREIGN PATENT DOCUMENTS

| CN | 102396288 A | 3/2012 |
|---|---|---|
| JP | 2002-135847 A | 5/2002 |

(Continued)

OTHER PUBLICATIONS

International Search Report w/translation from PCT/JP2010/067573 dated Dec. 28, 2010 (2 pages).
(Continued)

*Primary Examiner* — Alpus H Hsu
*Assistant Examiner* — Camquyen Thai
(74) *Attorney, Agent, or Firm* — Osha Liang LLP

(57) ABSTRACT

In a user equipment UE according to the present invention which appropriately measures downlink radio quality when multi-carrier transmission is performed, the user equipment UE includes a measurement unit 22B configured to perform measurement processes in the first carrier and the second carrier, wherein when simultaneous communication of a downlink signal in the first carrier and a downlink signal in the second carrier is performed, the measurement unit 22B is configured to perform only the measurement process in the second carrier.

10 Claims, 13 Drawing Sheets

(51) Int. Cl.
  H04L 5/00 (2006.01)
  H04L 5/14 (2006.01)
  H04J 11/00 (2006.01)
  H04L 1/20 (2006.01)
  H04W 24/10 (2009.01)
  H04W 72/00 (2009.01)
  H04W 88/02 (2009.01)
  H04W 88/08 (2009.01)

(52) U.S. Cl.
  CPC .............. H04L 5/0044 (2013.01); H04L 5/0048 (2013.01); H04L 5/0055 (2013.01); H04L 5/0082 (2013.01); H04L 5/0094 (2013.01); H04W 24/10 (2013.01); H04W 72/00 (2013.01); H04W 88/02 (2013.01); H04W 88/08 (2013.01)

(56) References Cited

U.S. PATENT DOCUMENTS

| | | | |
|---|---|---|---|
| 2007/0206631 A1* | 9/2007 | Parts et al. | 370/465 |
| 2008/0101262 A1* | 5/2008 | Brunel et al. | 370/278 |
| 2009/0052353 A1* | 2/2009 | D'Amico et al. | 370/280 |
| 2010/0020852 A1* | 1/2010 | Erell et al. | 375/141 |
| 2010/0173637 A1* | 7/2010 | Damnjanovic et al. | 455/447 |
| 2010/0226296 A1* | 9/2010 | Wala et al. | 370/294 |
| 2010/0246463 A1* | 9/2010 | Papasakellariou et al. | 370/311 |
| 2010/0303039 A1* | 12/2010 | Zhang et al. | 370/331 |
| 2010/0329216 A1* | 12/2010 | Jen | 370/332 |
| 2011/0021154 A1* | 1/2011 | Marinier et al. | 455/67.11 |
| 2011/0032885 A1* | 2/2011 | Wang et al. | 370/329 |
| 2011/0039577 A1* | 2/2011 | Stern-Berkowitz | G01S 5/0205 455/456.1 |
| 2011/0261776 A1* | 10/2011 | Ahn et al. | 370/329 |

FOREIGN PATENT DOCUMENTS

| | | |
|---|---|---|
| JP | 2003-9222 A | 1/2003 |
| JP | 2004-343356 A | 12/2004 |

OTHER PUBLICATIONS

3GPP TR 36.913 v8.0.1; "3rd Generation Partnership Project; Technical Specification Group Radio Access Network; Requirements for further advancements for Evolved Universal Terrestrial Radio Access (E-UTRA) (LTE-Advanced) (Release 8)"; Mar. 2009 (15 pages).
3GPP TS 36.211 v.8.3.0; "3rd Generation Partnership Project; Technical Specification Group Radio Access Network; Evolved Universal Terrestrial Radio Access (E-UTRA); Physical Channels and Modulation (Release 8)"; May 2008 (77 pages).
3GPP TR 36.815 v9.1.0; "3rd Generation Partnership Project; Technical Specification Group Radio Access Network; Further advancements for E-UTRA; LTE-Advanved feasibility studies in RAN WG4 (Release 9)"; Jun. 2010 (29 pages).
3GPP TR 36.942 v10.0.0; "3rd Generation Partnership Project; Technical Specification Group Radio Access Network; Evolved Universal Terrestrial Radio Access (E-UTRA); Radio Frequency (RF) system scenarios (Release 10)"; Jun. 2010 (110 pages).
3GPP TS 36.133 v9.4.0; "3rd Generation Partnership Project; Technical Specification Group Radio Access Network; Evolved Universal Terrestrial Radio Access (E-UTRA); Requirements for support of radio resource management (Release 9)"; Jun. 2010 (380 pages).
3GPP TS 36.133 v8.6.0; "3rd Generation Partnership Project; Technical Specification Group Radio Access Network; Evolved Universal Terrestrial Radio Access (E-UTRA); Requirements for support of radio resource management (Release 8)"; May 2009 (258 pages).
Office Action for corresponding Japanese Application No. 2011-535435, mailed Sep. 10, 2013 (5 pages).
Office Action in corresponding Chinese Patent Application No. 201080045097.8 dated Mar. 4, 2014, with translation (18 pages).

* cited by examiner (MORE SPECIFIC EXAMPLE)

(MORE SPECIFIC EXAMPLE)

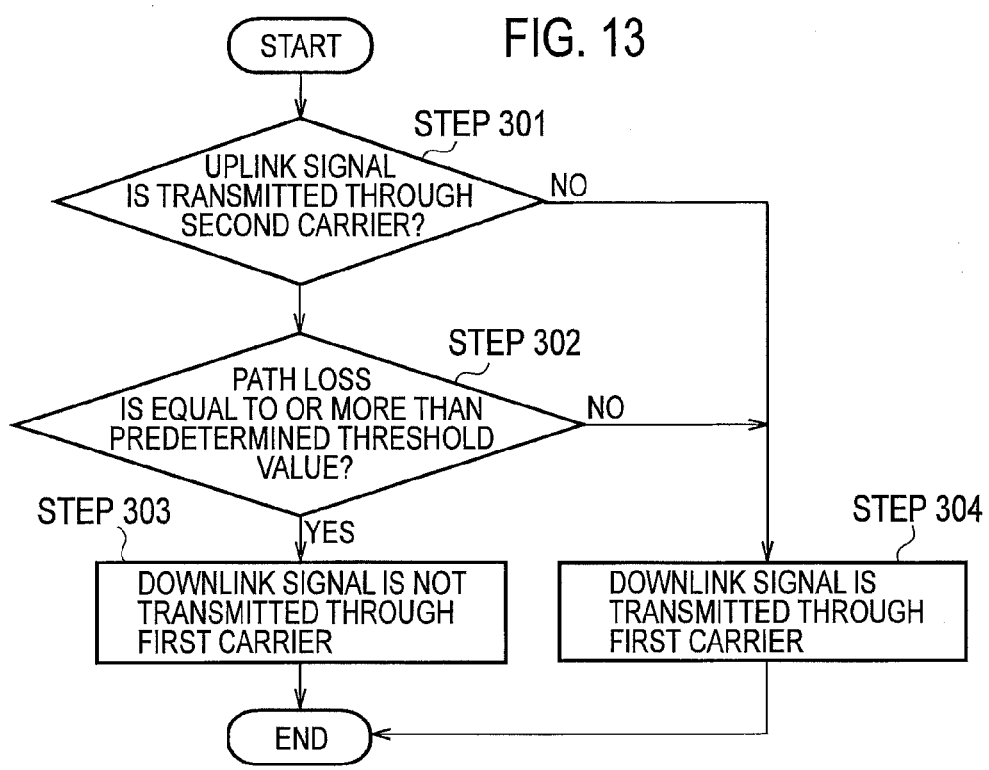
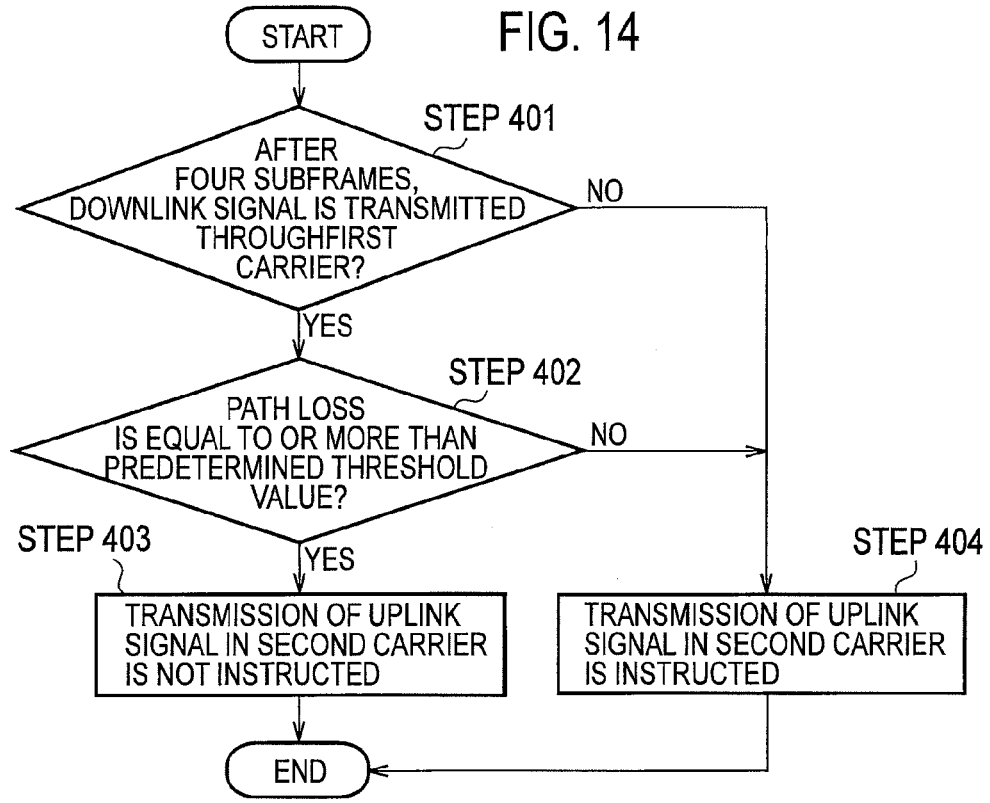

USER EQUIPMENT, BASE STATION DEVICE, AND MOBILE COMMUNICATION METHOD

TECHNICAL FIELD

The present invention relates to a technical field of a mobile communication, and more particularly, relates to a user equipment, a base station device, and a mobile communication method in a mobile communication system using a next-generation mobile communication technology.

BACKGROUND ART

A communication scheme, which is the next generation of a WCDMA (Wideband Code Division Multiplexing Access) scheme, an HSDPA (High-Speed Downlink Packet Access) scheme, an HSUPA (High-Speed Uplink Packet Access) scheme and the like, that is, an LTE (Long Term Evolution) scheme has been discussed in the 3GPP, which is a group aiming to standardize the WCDMA, and the specification work is under progress.

As a radio access scheme in the LTE scheme, an OFDMA (Orthogonal Frequency Division Multiplexing Access) scheme has been defined for a downlink, and an SC-FDMA (Single-Carrier Frequency Division Multiple Access) scheme has been defined for an uplink.

The OFDMA scheme denotes a multicarrier transmission scheme in which a frequency band is divided into a plurality of narrow frequency bands (subcarriers), and data is loaded on each subcarrier for transmission. According to the OFDMA scheme, subcarriers are densely arranged on the frequency axis while being orthogonal to one another, so that high-rate transmission is achieved, resulting in the improvement of frequency use efficiency.

The SC-FDMA scheme denotes a single carrier transmission scheme in which a frequency band is divided for each user equipment, and transmission is performed using different frequency bands among a plurality of user equipments. According to the SC-FDMA scheme, since it is possible to easily and efficiently reduce interference among the user equipments and suppress variation in transmission power, the SC-FDMA scheme is advantageous in terms of low power consumption of a user equipment, expansion of coverage and the like.

In the LTE scheme, communication is performed by assigning one or more RBs (Resource Blocks) to a user equipment in both a downlink and an uplink.

A base station device determines a user equipment, to which a resource block is to be assigned among a plurality of user equipments, for each subframe (1 ms in the LTE scheme) (this process will be called "scheduling").

In a downlink, the base station device transmits a shared channel signal to a user equipment, which is selected through the scheduling, by using one or more resource blocks. In an uplink, the user equipment selected through the scheduling transmits a shared channel signal to the base station device by using one or more resource blocks.

In addition, the shared channel signal is a signal on PUSCH (Physical Uplink Shared Channel) in an uplink, and is a signal on PDSCH (Physical Downlink Shared Channel) in a downlink.

Furthermore, as a next communication scheme of the LTE scheme, an LTE-advanced scheme has been discussed in the 3GPP.

In the LTE-advanced scheme, performing "Carrier aggregation" has been agreed as requirements. Here, the "Carrier aggregation" represents that communication is simultaneously performed using a plurality of carriers.

For example, when the "Carrier aggregation" is performed in the uplink, since a user equipment performs transmission using different carriers for each Component Carrier, the user equipment transmits an uplink signal using a plurality of carriers.

Furthermore, when the "Carrier aggregation" is performed in the downlink, since a base station device performs transmission using different carriers for each Component Carrier, the base station device transmits a downlink signal using a plurality of carriers.

However, in communication system employing an FDD (Frequency Division Duplex) scheme in which an uplink frequency is different from a downlink frequency, a user equipment has a device called Duplexer.

The Duplexer is parts sharing an antenna in a radio device employing the FDD scheme, and may also be called an antenna duplexer or a demultiplexer.

In general, in a radio device employing the FDD scheme which simultaneously performs transmission and reception, when one antenna serves as a transmission antenna and a reception antenna, a strong transmitted wave may be introduced in a receiver, resulting in the degradation of reception quality.

The Duplexer is a device for preventing an unnecessary part of the transmitted wave from propagating to a next stage circuit, avoiding the degradation of the reception quality due to the introduction of the unnecessary wave to the receiver, preventing the unnecessary wave from being radiated to the air through an antenna, and further extracting only a signal with a desired frequency, and has a function of electrically separating a transmission path from a reception path.

More specifically, the Duplexer performs the above-mentioned function by allowing filters having two different frequency bands to be shared by one terminal (an antenna terminal).

FIG. 5 is an image diagram of the Duplexer.

However, the above-mentioned conventional mobile communication system has the following problems.

As described above, in the LTE-Advanced scheme, the "Carrier aggregation" is performed. In this case, the above-mentioned problem may occur, that is, a transmission signal may degrade the quality of a reception signal.

For example, FIG. 6 illustrates an example in which transmission in an uplink and reception in a downlink are performed by a user equipment when the "Carrier aggregation" is performed.

As illustrated in FIG. 6, since a Duplexer of a second carrier in the user equipment does not consider a downlink frequency band of a first carrier, when transmission of an uplink signal in the second carrier and reception of a downlink signal in the first carrier are simultaneously performed in the user equipment, the uplink signal in the second carrier may degrade the reception quality of the downlink signal in the first carrier.

Furthermore, due to the above-mentioned influence of the uplink signal in the second carrier, when downlink radio quality is measured, it may not be possible to appropriately measure.

SUMMARY OF THE INVENTION

Therefore, the present invention has been achieved in view of the above-described problems, and an object thereof is to provide a user equipment, a base station device, and a mobile communication method, by which it is possible to appropriately measure a downlink radio quality when multicarrier transmission is performed.

A first characteristic of the present invention is summarized as a user equipment, which performs radio communication with a base station device using a first carrier and a second carrier in a mobile communication system, comprising: a measurement unit configured to perform measurement processes in the first carrier and the second carrier, in which the measurement unit is configured to perform only the measurement process in the second carrier.

A second characteristic of the present invention is summarized as a user equipment, which performs radio communication with a base station device using a first carrier and a second carrier in a mobile communication system, comprising: a measurement unit configured to perform measurement processes in the first carrier and the second carrier, in which the measurement unit is configured to perform measurement in the first carrier only when an uplink signal in the second carrier is not transmitted.

A third characteristic of the present invention is summarized as a base station device, which performs radio communication with a user equipment using a first carrier and a second carrier in a mobile communication system, comprising: a control signal transmission unit configured to instruct the user equipment to perform measurement processes in the first carrier and the second carrier, in which the control signal transmission unit is configured to instruct the user equipment to perform only the measurement process in the second carrier.

A fourth characteristic of the present invention is summarized as a mobile communication method, which performs radio communication between a base station device and a user equipment using a first carrier and a second carrier in a mobile communication system, comprising: a step of performing measurement processes in the first carrier and the second carrier, in which in the step, the measurement process in the first carrier is performed only when an uplink signal in the second carrier is not transmitted.

BRIEF DESCRIPTION OF THE DRAWINGS

FIG. 13 is a flowchart illustrating an operation of the mobile communication system according to the first embodiment of the present invention.

FIG. 14 is a flowchart illustrating an operation of a mobile communication system according to the first embodiment of the present invention.

DETAILED DESCRIPTION (Configuration of Mobile Communication System According to First Embodiment of the Present Invention)

Figure 1:
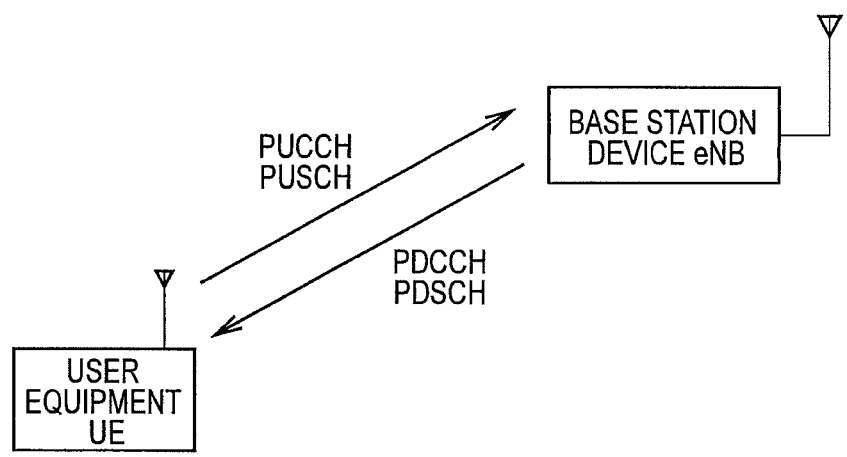
FIG. 1 is a diagram showing the entire configuration of a mobile communication system according to a first embodiment of the present invention.
Figure 2:
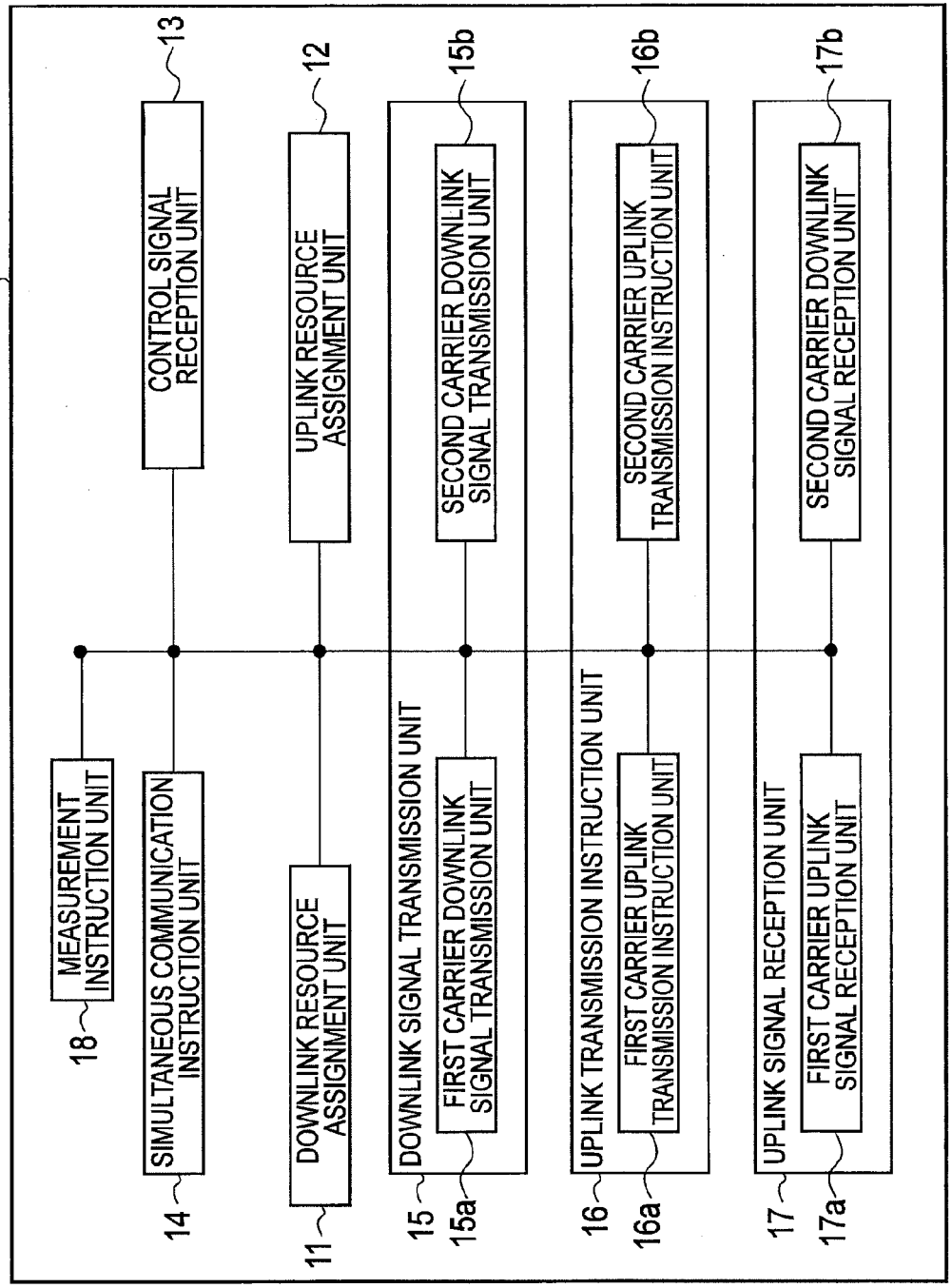
FIG. 2 is a functional block diagram of a base station device according to the first embodiment of the present invention.
Figure 3:
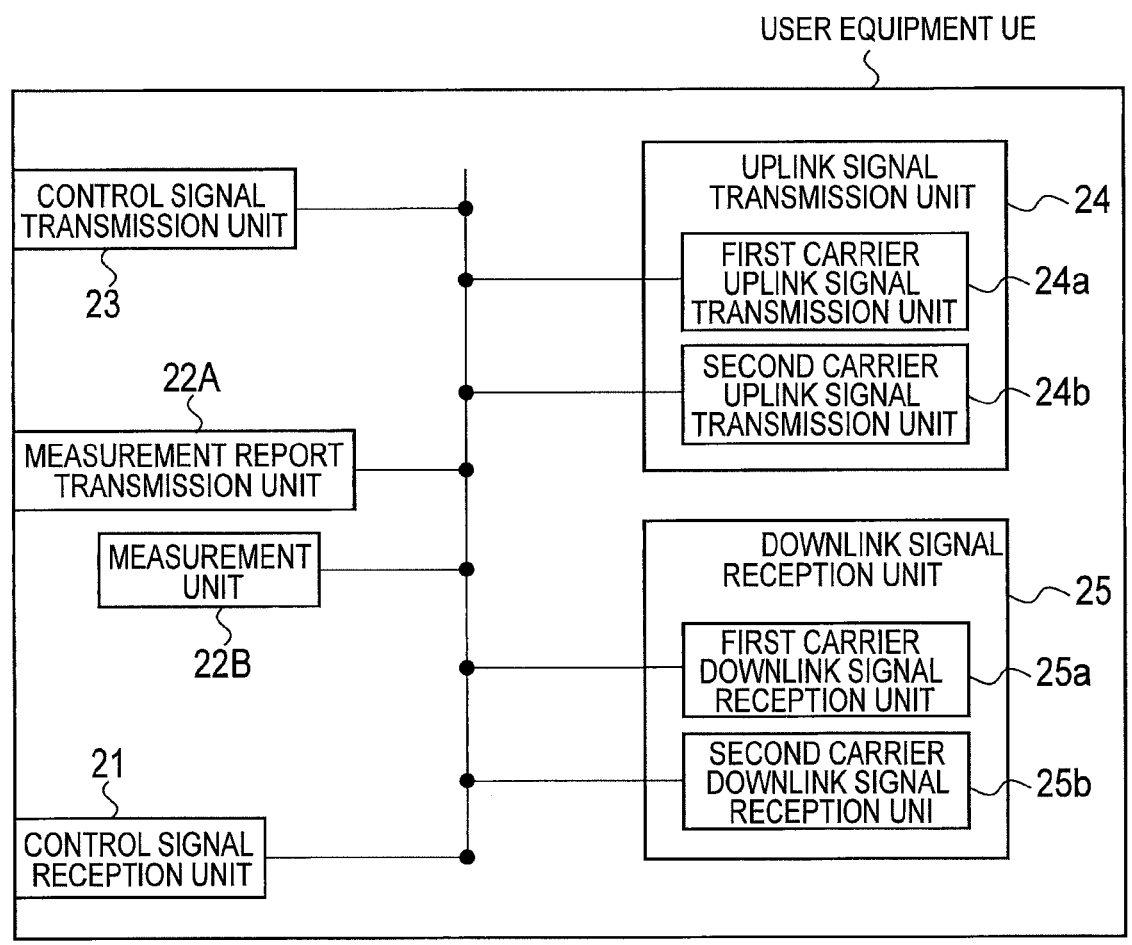
FIG. 3 is a functional block diagram of a user equipment according to the first embodiment of the present invention.

With reference to FIG. 1 to FIG. 3, the configuration of a mobile communication system according to a first embodiment of the present invention will be described.

The mobile communication system according to the present embodiment is an LTE-advanced mobile communication system, and is configured such that the "Carrier aggregation" is applicable.

Figure 6:
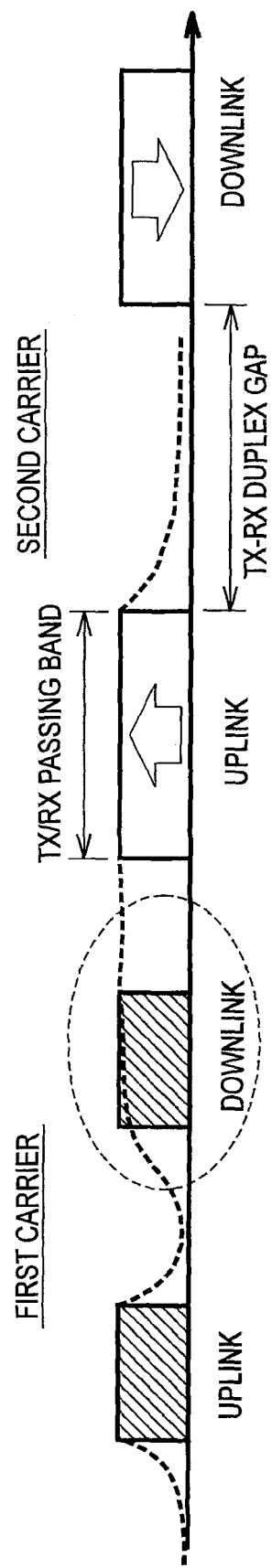
FIG. 6 is a diagram explaining problems of the conventional mobile communication system.

In the mobile communication system according to the present embodiment, radio communication is configured to be performed between a user equipment UE and a base station device eNB using a plurality of carriers (frequency bands), for example, a first carrier and a second carrier, as illustrated in FIG. 6.

In addition, in the present specification, the case in which a downlink signal of the first carrier and an uplink signal in the second carrier interfere with each other will be described as an example. That is, in the example of the present specification, the uplink signal in the second carrier causes interference to the downlink signal of the first carrier. The present invention is also applicable to cases other than the above case. For example, the present invention is also applicable to the case in which three or more carriers exist and interference occurs among a plurality of carriers.

Furthermore, a positional relation in a frequency direction between the first carrier and the second carrier illustrated in FIG. 6 is an example, and positional relations in a frequency direction other than the positional relation illustrated in FIG. 6 may exist.

Furthermore, in the mobile communication system according to the present embodiment, it is assumed that an uplink signal in the first carrier does not cause interference to the downlink signal in the first carrier or a downlink signal in the second carrier.

In the mobile communication system according to the present embodiment, as illustrated in FIG. 1, in an uplink, for example, a control signal is configured to be transmitted through PUCCH (Physical Uplink Control Channel), and a data signal is configured to be transmitted through PUSCH (Physical Uplink Shared Channel).

Furthermore, in the mobile communication system according to the present embodiment, as illustrated in FIG. 1, for example, in a downlink, a control signal is configured to be transmitted through PDCCH (Physical Downlink Control Channel), and a data signal is configured to be transmitted through PDSCH (Physical Downlink Shared Channel).

As illustrated in FIG. 2, the base station device eNB according to the present embodiment includes a downlink resource assignment unit 11, an uplink resource assignment unit 12, a control signal reception unit 13, a simultaneous communication instruction unit 14, a downlink signal transmission unit 15, an uplink transmission instruction unit 16, an uplink signal reception unit 17, and a measurement instruction unit 18.

The downlink resource assignment unit 11 is configured to assign a radio resource for a downlink signal to the user equipment UE.

In addition, the radio resource for the downlink signal, which is assigned by the downlink resource assignment unit 11, may be notified to the user equipment UE through the signaling of a physical layer, a MAC layer, or an RRC layer.

Here, the downlink signal may be at least one of a downlink shared channel signal, a downlink data channel signal, a downlink control channel signal, a downlink control signal for instructing uplink transmission, a downlink control signal for notifying downlink transmission, transmission acknowledgement information on an uplink shared channel signal, a downlink signal to which Semi-persistent Scheduling is applied, transmission acknowledgement information on an uplink signal to which the Semi-persistent Scheduling is applied, a paging signal, and DCCH (Dedicated Control Channel (DCCH)).

More specifically, the downlink resource assignment unit 11 may also be configured to assign in the second carrier a radio resource for the downlink shared channel signal or the downlink data channel signal.

Here, in the second carrier, assigning a radio resource for the downlink control channel signal may also indicate the transmission of the downlink shared channel signal or the downlink data channel signal in the second carrier.

In this case, even when radio communication is performed between the user equipment UE and the base station device eNB using the first carrier and the second carrier, the downlink shared channel signal or the downlink data channel signal is transmitted through the second carrier.

More specifically, the downlink resource assignment unit 11 may also be configured to assign a radio resource for the downlink control channel signal (PDCCH: Physical Downlink Control Channel) in the second carrier. Here, in the second carrier, assigning the radio resource for the downlink control channel signal may also indicate the transmission of the downlink control channel signal in the second carrier. In this case, even when radio communication is performed between the user equipment UE and the base station device eNB using the first carrier and the second carrier, the downlink control channel signal is transmitted through the second carrier. The downlink control channel signal may also include the downlink control signal for instructing uplink transmission or the downlink control signal for notifying downlink transmission.

More specifically, the downlink resource assignment unit 11 may also be configured to assign a radio resource for the transmission acknowledgement information on the uplink shared channel signal in the second carrier.

Here, in the second carrier, assigning the radio resource for the transmission acknowledgement information on the uplink shared channel signal may also indicate the transmission of the transmission acknowledgement information on the uplink shared channel signal in the second carrier.

In this case, even when radio communication is performed between the user equipment UE and the base station device eNB using the first carrier and the second carrier, the transmission acknowledgement information on the uplink shared channel signal is transmitted through the second carrier.

More specifically, the downlink resource assignment unit 11 may also be configured to assign a radio resource for the downlink signal, to which the Semi-persistent Scheduling is applied, in the second carrier.

Here, in the second carrier, assigning the radio resource for the downlink signal, to which the Semi-persistent Scheduling is applied, may also indicate the transmission of the downlink signal, to which the Semi-persistent Scheduling is applied, in the second carrier.

In this case, even when radio communication is performed between the user equipment UE and the base station device eNB using the first carrier and the second carrier, the downlink signal, to which the Semi-persistent Scheduling is applied, is transmitted through the second carrier.

More specifically, the downlink resource assignment unit 11 may also be configured to assign a radio resource for the transmission acknowledgement information on the uplink signal, to which the Semi-persistent Scheduling is applied, in the second carrier.

Here, in the second carrier, assigning the radio resource for the transmission acknowledgement information on the uplink signal, to which the Semi-persistent Scheduling is applied, may also mean the transmission of the transmission acknowledgement information on the uplink signal, to which the Semi-persistent Scheduling is applied, in the second carrier.

In this case, even when radio communication is performed between the user equipment UE and the base station device eNB using the first carrier and the second carrier, the transmission acknowledgement information on the uplink signal, to which the Semi-persistent Scheduling is applied, is transmitted through the second carrier.

More specifically, the downlink resource assignment unit 11 may also be configured to assign a radio resource for the paging signal in the second carrier.

Here, in the second carrier, assigning the radio resource for the paging signal may also mean the transmission of the paging signal in the second carrier.

In this case, even when radio communication is performed between the user equipment UE and the base station device eNB using the first carrier and the second carrier, the paging signal is transmitted through the second carrier.

More specifically, the downlink resource assignment unit 11 may also be configured to assign a radio resource for DCCH (Dedicated Control Channel (DCCH)) in the second carrier.

Here, in the second carrier, assigning the radio resource for the dedicated control channel may also mean the transmission of the dedicated control channel in the second carrier.

In this case, even when radio communication is performed between the user equipment UE and the base station device eNB using the first carrier and the second carrier, the dedicated control channel is transmitted through the second carrier.

As described above, the radio resource of the downlink signal is assigned in the second carrier not affected by adverse influence from the uplink signal of the second carrier, so that it is possible to avoid the problem that the uplink signal of the second carrier degrades the reception characteristics of the downlink signal of the first carrier.

Furthermore, for example, the downlink resource assignment unit 11 may also be configured to assign a radio resource for the downlink signal in the second carrier to a user equipment UE capable of simultaneously communicating through the first carrier and the second carrier, that is, a user equipment UE having "Capability" of "Carrier aggregation", and may also be configured to assign a radio resource for the downlink signal in the first carrier to a user equipment UE which may not simultaneously communicate through the first carrier and the second carrier, that is, a user equipment UE having no "Capability" of the "Carrier aggregation".

In addition, the Capability of the Carrier aggregation may also be notified from a user equipment UE. In this case, the Capability of the Carrier aggregation may also be notified to the downlink resource assignment unit 11 from a user equipment UE via the control signal reception unit 13.

Figure 7:
FIG. 7 is a diagram explaining a notification method of Capability of Carrier aggregation by a mobile station in the mobile communication system according to the first embodiment of the present invention.
Figure 8:
FIG. 8 is a diagram explaining a notification method of Capability of Carrier aggregation by the mobile station in the mobile communication system according to the first embodiment of the present invention.

The Capability of the Carrier aggregation may also be notified from a user equipment UE by a configuration as illustrated in FIG. 7 or FIG. 8 as will be described later.

More specifically, the downlink resource assignment unit 11 may also be configured to assign a radio resource for the downlink control channel signal (PDCCH: Physical Downlink Control Channel) in the second carrier to the user equipment UE capable of simultaneously communicating through the first carrier and the second carrier, that is, the user equipment UE having "Capability" of "Carrier aggregation", and may also be configured to assign a radio resource for the downlink control channel signal (PDCCH: Physical Downlink Control Channel) in the first carrier to the user equipment UE which may not simultaneously communicate through the first carrier and the second carrier, that is, the user equipment UE having no "Capability" of the "Carrier aggregation".

In addition, in the above-mentioned example, in relation to the downlink control channel signal, based on whether it is possible for the user equipment UE to simultaneously communicate through the first carrier and the second carrier, whether the radio resource in the first carrier is assigned or the radio resource in the second carrier is assigned is determined. However, instead, the same process may also be performed with respect to the downlink shared channel signal, the downlink data channel signal, the downlink control signal for instructing uplink transmission, the downlink control signal for notifying downlink transmission, the transmission acknowledgement information on the uplink shared channel signal, the downlink signal to which the Semi-persistent Scheduling is applied, the transmission acknowledgement information on the uplink signal to which the Semi-persistent Scheduling is applied, the paging signal, or the dedicated control channel.

Alternatively, the downlink resource assignment unit 11 may also be configured to determine a carrier, in which the radio resource for the downlink signal is to be assigned, based on information regarding whether uplink transmission of the first carrier and the second carrier is possible, which has been received in the control signal reception unit 13.

For example, the downlink resource assignment unit 11 may also be configured to assign the radio resource for the downlink signal in the first carrier to a user equipment UE in which the uplink transmission of the first carrier is possible and the uplink transmission of the second carrier is not possible, and may also be configured to assign the radio resource for the downlink signal in the second carrier to a user equipment UE in which the uplink transmission of the first carrier is not possible and the uplink transmission of the second carrier is possible.

Furthermore, the downlink resource assignment unit 11 may also be configured to assign the radio resource for the downlink signal in the second carrier to a user equipment UE in which the uplink transmission of the first carrier is possible and the uplink transmission of the second carrier is possible.

Alternatively, the downlink resource assignment unit 11 may also be configured to determine a carrier, in which the radio resource for the downlink signal is to be assigned, based on information regarding whether to perform simultaneous communication using a plurality of carriers, which has been received in the simultaneous communication instruction unit 14.

For example, the downlink resource assignment unit 11 may also be configured to assign the radio resource for the downlink signal in the second carrier to a user equipment UE which performs the simultaneous communication using the plurality of carriers, and may also be configured to assign the radio resource for the downlink signal in the first carrier to a user equipment UE which does not perform the simultaneous communication using the plurality of carriers. In addition, the downlink resource assignment unit 11 may also be configured to assign the radio resource for the downlink signal in the first carrier by setting the first carrier as "Anchor Carrier", and to assign the radio resource for the downlink signal in the second carrier by setting the second carrier as the "Anchor Carrier".

Here, the Anchor Carrier may also be defined as a carrier through which the downlink control channel signal is transmitted, a carrier through which the downlink control signal for instructing uplink transmission is transmitted, a carrier through which the downlink control signal for notifying downlink transmission is transmitted, a carrier through which the transmission acknowledgement information on the uplink shared channel signal is transmitted, a carrier through which the downlink signal, to which the Semi-persistent Scheduling is applied, is transmitted, a carrier through which the transmission acknowledgement information on the uplink signal, to which the Semi-persistent Scheduling is applied, is transmitted, a carrier through which the paging signal is transmitted, or a carrier through which the DCCH (Dedicated Control Channel (DCCH)) is transmitted.

Alternatively, the Anchor Carrier may also be defined as a carrier in which measurement is performed. Alternatively, the Anchor Carrier may also be defined by a combination of the above-mentioned definitions.

Here, the DCCH may include "Measurement Report", "Handover Command (a handover command signal)", or "Handover Complete (a handover complete signal)".

The "Anchor Carrier" may also be called "Main Carrier".

Alternatively, the Anchor Carrier may also be called Primary Carrier. Furthermore, a serving cell in the Primary Carrier may also be called Primary Cell (Pcell).

That is, the downlink resource assignment unit 11 may also be configured to set the second carrier as the Primary Carrier. In this case, the second carrier not affected by adverse influence from the uplink signal of the second carrier is set as the Primary Carrier, so that it is possible to avoid the problem that the uplink signal of the second carrier degrades the reception characteristics of the downlink signal of the first carrier.

Alternatively, the downlink resource assignment unit 11 may also be configured to set the second carrier as the Primary Carrier with respect to the user equipment UE capable of simultaneously communicating through the first carrier and the second carrier, that is, the user equipment UE having the "Capability" of the "Carrier aggregation", and may also be configured to set communication through the first carrier with respect to the user equipment UE which may not simultaneously communicate through the first carrier and the second carrier, that is, the user equipment UE having no "Capability" of the "Carrier aggregation".

Alternatively, the downlink resource assignment unit 11 may also be configured to determine a carrier to be set as the Primary Carrier, based on the information regarding whether the uplink transmission of the first carrier and the second carrier is possible, which has been received in the control signal reception unit 13.

For example, the downlink resource assignment unit 11 may also be configured to set the first carrier as the Primary Carrier with respect to the user equipment UE in which the uplink transmission of the first carrier is possible and the uplink transmission of the second carrier is not possible, and may also be configured to set the second carrier as the Primary Carrier with respect to the user equipment UE in which the uplink transmission of the first carrier is not possible and the uplink transmission of the second carrier is possible.

Furthermore, the downlink resource assignment unit 11 may also be configured to set the second carrier as the Primary Carrier with respect to the user equipment UE in which the uplink transmission of the first carrier is possible and the uplink transmission of the second carrier is possible.

Alternatively, the downlink resource assignment unit 11 may also be configured to determine a carrier to be set as the Primary Carrier, based on the information regarding whether to perform the simultaneous communication using the plurality of carriers, which has been received in the simultaneous communication instruction unit 14.

For example, the downlink resource assignment unit 11 may also be configured to set the second carrier as the Primary Carrier with respect to the user equipment UE which performs the simultaneous communication using the plurality of carriers, and may also be configured to set the first carrier as the Primary Carrier with respect to the user equipment UE which does not perform the simultaneous communication using the plurality of carriers.

The uplink resource assignment unit 12 is configured to assign a radio resource for an uplink signal to a user equipment UE.

In addition, the radio resource for the uplink signal assigned by the uplink resource assignment unit 12 may also be notified to the user equipment UE through the signaling of a physical layer, a MAC layer, or an RRC layer.

Here, the uplink signal may be at least one of an uplink shared channel signal, an uplink data channel signal, an uplink control channel signal, a control signal for notifying a downlink channel state, transmission acknowledgement information on a downlink shared channel signal, a scheduling request, a reference signal for sounding, a random access channel signal, an uplink signal to which the Semi-persistent Scheduling is applied, transmission acknowledgement information on a downlink signal to which the Semi-persistent Scheduling is applied, and the DCCH (Dedicated Control Channel).

More specifically, the uplink resource assignment unit 12 may also be configured to assign a radio resource for the uplink shared channel signal or the uplink data channel signal in the first carrier.

Here, in the first carrier, assigning the radio resource for the uplink shared channel signal or the uplink data channel signal may also mean to instruct to transmit the uplink shared channel signal or the uplink data channel signal in the first carrier to the user equipment UE.

In this case, even when radio communication is performed between the user equipment UE and the base station device eNB using the first carrier and the second carrier, the uplink shared channel signal or the uplink data channel signal is transmitted through the first carrier.

Alternatively, more specifically, the uplink resource assignment unit 12 may also be configured to assign a radio resource for the uplink control channel signal in the first carrier.

Here, in the first carrier, assigning the radio resource for the uplink control channel signal may also mean to instruct to transmit the uplink control channel signal in the first carrier to the user equipment UE.

In this case, even when radio communication is performed between the user equipment UE and the base station device eNB using the first carrier and the second carrier, the uplink control channel signal is transmitted through the first carrier.

Here, the uplink control channel signal may also include at least one of the control signal for notifying the downlink channel state, the transmission acknowledgement information on the downlink shared channel signal, the scheduling request, and the transmission acknowledgement information on the downlink signal to which the Semi-persistent Scheduling is applied.

Alternatively, more specifically, the uplink resource assignment unit 12 may also be configured to assign a radio resource for the reference signal for sounding in the first carrier.

Here, in the first carrier, assigning the radio resource for the reference signal for sounding may also mean to instruct to transmit the reference signal for sounding in the first carrier to the user equipment UE.

In this case, even when radio communication is performed between the user equipment UE and the base station device eNB using the first carrier and the second carrier, the reference signal for sounding is transmitted through the first carrier.

Alternatively, more specifically, the uplink resource assignment unit 12 may also be configured to assign a radio resource for the random access channel signal in the first carrier.

In the first carrier, assigning the radio resource for the random access channel signal may also mean to instruct to transmit the random access channel signal in the first carrier to the user equipment UE.

In this case, even when radio communication is performed between the user equipment UE and the base station device eNB using the first carrier and the second carrier, the random access channel signal is transmitted through the first carrier.

Alternatively, more specifically, the uplink resource assignment unit 12 may also be configured to assign a radio resource for the uplink signal, to which the Semi-persistent Scheduling is applied, in the first carrier.

Here, in the first carrier, assigning the radio resource for the uplink signal, to which the Semi-persistent Scheduling is applied, may also mean to instruct to transmit to the user equipment UE the uplink signal, to which the Semi-persistent Scheduling is applied, in the first carrier.

In this case, even when radio communication is performed between the user equipment UE and the base station device eNB using the first carrier and the second carrier, the uplink signal, to which the Semi-persistent Scheduling is applied, is transmitted through the first carrier.

Alternatively, more specifically, the uplink resource assignment unit 12 may also be configured to assign a radio resource for the dedicated control channel in the first carrier.

Here, in the first carrier, assigning the radio resource for the dedicated control channel may also mean to instruct to transmit the dedicated control channel in the first carrier to the user equipment UE.

In this case, even when radio communication is performed between the user equipment UE and the base station device eNB using the first carrier and the second carrier, the dedicated control channel is transmitted through the first carrier.

Furthermore, for example, the uplink resource assignment unit 12 may also be configured to assign a radio resource for the uplink signal in the first carrier to the user equipment UE capable of simultaneously communicating through the first carrier and the second carrier, and may also be configured to assign a radio resource for the uplink signal in the second carrier to the user equipment UE which may not simultaneously communicate through the first carrier and the second carrier.

In addition, information regarding whether it is possible to simultaneously communicate through the first carrier and the second carrier may also be notified from a user equipment UE. In this case, the information regarding whether it is possible to simultaneously communicate through the first carrier and the second carrier may also be notified to the uplink resource assignment unit 12 from a user equipment UE via the control signal reception unit 13.

The Capability of the Carrier aggregation may also be notified from a user equipment UE by a configuration as illustrated in FIG. 7 or FIG. 8 as will be described later.

More specifically, the uplink resource assignment unit 12 may also be configured to assign a radio resource for the uplink control channel signal in the first carrier to the user equipment UE capable of simultaneously communicating through the first carrier and the second carrier, and may also be configured to assign a radio resource for the uplink control channel signal in the second carrier to the user equipment UE which may not simultaneously communicate through the first carrier and the second carrier.

In addition, in the above-mentioned example, in relation to the uplink control channel signal, based on whether it is possible for the user equipment UE to simultaneously communicate through the first carrier and the second carrier, whether the radio resource in the first carrier is assigned or the radio resource in the second carrier is assigned is determined. However, instead, the same process may also be performed with respect to the uplink shared channel signal, the uplink data channel signal, the control signal for notifying the downlink channel state, the transmission acknowledgement information on the downlink shared channel signal, the scheduling request, the reference signal for sounding, the random access channel signal, the uplink signal to which the Semi-persistent Scheduling is applied, the transmission acknowledgement information on the downlink signal to which the Semi-persistent Scheduling is applied, or the dedicated control channel.

Alternatively, the uplink resource assignment unit 12 may also be configured to determine a carrier, in which the radio resource for the uplink signal is to be assigned, based on the information regarding whether uplink transmission of the first carrier and the second carrier is possible, which has been received in the control signal reception unit 13. For example, the uplink resource assignment unit 12 may also be configured to assign the radio resource for the uplink signal in the first carrier to a user equipment UE in which the uplink transmission of the first carrier is possible and the uplink transmission of the second carrier is not possible, and may also be configured to assign the radio resource for the uplink signal in the second carrier to a user equipment UE in which the uplink transmission of the first carrier is not possible and the uplink transmission of the second carrier is possible. Furthermore, the uplink resource assignment unit 12 may also be configured to assign the radio resource for the uplink signal in the first carrier to a user equipment UE in which the uplink transmission of the first carrier is possible and the uplink transmission of the second carrier is possible.

Alternatively, the uplink resource assignment unit 12 may also be configured to determine a carrier, in which the radio resource for the uplink signal is to be assigned, based on the information regarding whether to simultaneously communicate using a plurality of carriers, which has been received in the simultaneous communication instruction unit 14. For example, the uplink resource assignment unit 12 may also be configured to assign the radio resource for the uplink signal in the first carrier to a user equipment UE which performs the simultaneous communication using the plurality of carriers, and may also be configured to assign the radio resource for the uplink signal in the second carrier to a user equipment UE which does not simultaneously communicate using the plurality of carriers.

In addition, the uplink resource assignment unit 12 may also be configured to assign the radio resource for the uplink signal in the first carrier by setting the first carrier as "Anchor Carrier".

In addition, the uplink resource assignment unit 12 may also be configured to assign the radio resource for the uplink signal in the first carrier by setting the first carrier as the Anchor Carrier, and to assign the radio resource for the uplink signal in the second carrier by setting the second carrier as the "Anchor Carrier".

Here, the Anchor Carrier may also be defined as a carrier through which the uplink control channel signal is transmitted, a carrier through which the control signal for notifying the downlink channel state is transmitted, a carrier through which the transmission acknowledgement information on the downlink shared channel signal is transmitted, a carrier through which the scheduling request is transmitted, a carrier through which the random access channel signal is transmitted, a carrier through which the uplink signal, to which the Semi-persistent Scheduling is applied, is transmitted, or a carrier through which the transmission acknowledgement information on the downlink signal, to which the Semi-persistent Scheduling is applied, is transmitted. Alternatively, the Anchor Carrier may also be defined by a combination of the above-mentioned definitions. Alternatively, the Anchor Carrier may also be called Primary Carrier. Furthermore, a serving cell in the Primary Carrier may also be called Primary Cell (Pcell).

The control signal reception unit 13 is configured to receive a control signal for notifying the "Capability" of a user equipment UE from the user equipment UE.

Here, the control signal includes information on simultaneously communicable carriers and information on a carrier capable of transmitting an uplink signal among the simultaneously communicable carriers.

For example, the information on simultaneously communicable carriers and the information on a carrier capable of transmitting an uplink signal among the simultaneously communicable carriers may also be notified as a part of Radio Frequency parameters (RF parameters) of a message for notifying the Capability of a user equipment UE.

More specifically, the information on simultaneously communicable carriers and the information on a carrier capable of transmitting an uplink signal among the simultaneously communicable carriers may also be notified by the configuration as illustrated in FIG. 7.

That is, a list of frequency band indicators may also be notified as the information on simultaneously communicable carriers, and whether the uplink transmission is possible, for example, YES or NO may also be notified to respective frequency bands.

Furthermore, FIG. 8 illustrates an example of the case in which two carriers can simultaneously communicate. In FIG. 8, a carrier in a Band 1 and a carrier in a Band 3 can simultaneously communicate, and it is notified that the uplink transmission is possible in the Band 3 (the first carrier) and is not possible in the Band 1 (the second carrier).

Figure 9:
FIG. 9 is a diagram explaining a notification method of information and the like on a simultaneously communicable carrier notified by the mobile station in the mobile communication system according to the first embodiment of the present invention.

Alternatively, for example, the information on simultaneously communicable carriers and the information on a carrier capable of transmitting an uplink signal among the simultaneously communicable carriers may also be notified by the configuration as illustrated in FIG. 9.

That is, a list of frequency band indicators may also be notified as the information on simultaneously communicable carriers, and a category for the uplink transmission may also be notified to respective frequency bands.

Here, the category for the uplink transmission may also be determined based on the degree by which the uplink transmission causes adverse influence, that is, interference power, to a downlink when the uplink transmission is performed in the frequency band.

Furthermore, the category may also be a category separately defined as a performance definition of a user equipment UE.

More specifically, a category A may also be defined as a category which does not cause adverse influence to the downlink, a category B is a category which slightly causes adverse influence to the downlink, and a category C is a category which significantly causes adverse influence to the downlink.

Alternatively, the categories A, B, and C may also be determined by a definition value in the above-mentioned performance definition. Furthermore, the category C may also be a category for prohibiting the uplink transmission in the frequency band.

Figure 10:
FIG. 10 is a diagram explaining a notification method of information and the like on a simultaneously communicable carrier notified by the mobile station in the mobile communication system according to the first embodiment of the present invention.

Furthermore, FIG. 10 illustrates an example of the case in which two carriers can simultaneously communicate. In FIG. 10, a carrier in a Band 1 and a carrier in a Band 3 can simultaneously communicate, the category A, in which the uplink transmission is possible in the Band 3 (the first carrier), is notified, and the category B, in which the uplink transmission in the Band 1 (the second carrier) slightly causes adverse influence to a downlink signal, is notified.

In addition, in the above-mentioned example, the frequency band indicator is notified as the carrier information. However, instead, a frequency of an uplink carrier or a frequency of a downlink carrier may also be notified.

Furthermore, the carrier frequency may also be specified by EARFCN (E-UTRA Absolute Radio Frequency Channel Number).

Alternatively, separately, the first carrier or the second carrier may also be notified as the carrier information, and in relation to the first carrier and the second carrier, a bit for notifying the possibility of the uplink transmission may also be defined.

In addition, the control signal reception unit 13 notifies the downlink resource assignment unit 11, the uplink resource assignment unit 12, the downlink signal transmission unit 15, and the uplink transmission instruction unit 16 of the control signal for notifying the "Capability", that is, the information on simultaneously communicable carriers, and the information on a carrier capable of transmitting an uplink signal among the simultaneously communicable carriers.

Here, the information on a carrier capable of transmitting an uplink signal among the simultaneously communicable carriers includes information regarding the possibility of the uplink transmission of the first carrier and the second carrier.

The simultaneous communication instruction unit 14 is configured to instruct a user equipment UE to simultaneously communicate (that is, "Carrier aggregation") using a plurality of carriers. Here, the simultaneous communication instruction unit 14 may also be configured to instruct the user equipment UE to simultaneously communicate using a plurality of carriers by setting a secondary carrier using an RRC message, in addition to the primary carrier. Alternatively, the simultaneous communication instruction unit 14 may also be configured to instruct the user equipment UE not to simultaneously communicate using a plurality of carriers by deleting the secondary carrier using the RRC message. The setting/deletion of the secondary carrier may be performed only for an uplink, performed only for a downlink, or performed for both the uplink and the downlink. Alternatively, the simultaneous communication instruction unit 14 may also be configured to instruct the user equipment UE to simultaneously communicate using a plurality of carriers by activating the secondary carrier using a control signal of a MAC layer. Alternatively, the simultaneous communication instruction unit 14 may also be configured to instruct the user equipment UE not to simultaneously communicate using a plurality of carriers by deactivating the secondary carrier using the control signal of the MAC layer. The activation/deactivation of the secondary carrier may be performed only for the uplink, performed only for the downlink, or performed for both the uplink and the downlink.

For example, the simultaneous communication instruction unit 14 may also be configured to determine whether to instruct (ON/OFF) the user equipment UE to simultaneously communicate using a plurality of carriers based on at least one of path loss between the base station device eNB and the user equipment UE, downlink radio quality, and downlink channel state information.

In addition, the path loss, the downlink radio quality, and the downlink channel state information may also be notified by the user equipment UE.

Here, the downlink radio quality may be at least one of a reception level (RSRP), an SIR, a Channel Quality Indicator, and an RSRQ of a downlink reference signal.

Furthermore, the path loss may also be calculated from transmission power in the user equipment UE of the reference signal for sounding transmitted from the user equipment UE, and received power of the base station device eNB.

In addition, the transmission power in the user equipment UE of the reference signal for sounding may also be calculated by a Power headroom reported from the user equipment UE.

Alternatively, the path loss may also be directly calculated from the Power headroom reported from the user equipment UE. In this case, it is assumed that the Power headroom is calculated using path loss held by the user equipment UE, and information other than the path loss.

For example, the simultaneous communication instruction unit 14 may also be configured to determine not to simultaneously communicate using a plurality of carriers when the path loss between the base station device eNB and the user equipment UE is equal to or more than a predetermined threshold value, and determine to simultaneously communicate using a plurality of carriers in other cases.

Alternatively, the simultaneous communication instruction unit 14 may also be configured to determine to simultaneously communicate using a plurality of carriers when the downlink radio quality is equal to or more than a predetermined threshold value, and determine not to simultaneously communicate using a plurality of carriers in other cases.

Here, the path loss being equal to or more than the predetermined threshold value or not may also indicate that path loss of the first carrier between the user equipment UE and the base station device eNB is equal to or more than the threshold value or not, or path loss of the second carrier between the user equipment UE and the base station device eNB is equal to or more than the threshold value or not.

Alternatively, the path loss being equal to or more than the predetermined threshold value or not may also mean that a value obtained by subtracting the path loss of the first carrier from the path loss of the second carrier is equal to or more than the threshold value or not.

In this case, the simultaneous communication instruction unit 14 may also be configured to determine to simultaneously communicate using a plurality of carriers when the value obtained by subtracting the path loss of the first carrier from the path loss of the second carrier is not equal to or more than the threshold value, and determine not to simultaneously communicate using a plurality of carriers in other cases.

That is, the path loss is not limited to an absolute value of the path loss of the first carrier and an absolute value of the path loss of the second carrier between the user equipment UE and the base station device eNB. For example, the path loss may also include relative values of the path loss of the first carrier and the path loss of the second carrier.

In this way, for example, when the simultaneous communication instruction unit 14 determines that the path loss of the first carrier and the path loss of the second carrier are sufficient for performing single carrier communication through the respective carriers, and uplink transmission through the second carrier and simultaneous downlink reception through the first carrier and the second carrier can be implemented, it is possible to more accurately determine and avoid the case in which the path loss of the second carrier is large, that is, transmission power is large and the path loss of the first carrier is large, that is, a reception signal level is small, resulting in the relative degradation of reception signal quality of the first carrier due to a transmission signal of the second carrier.

Furthermore, the predetermined threshold value of the path loss may also include path loss between the user equipment UE and a base station device, other than the base station device eNB, in addition to the path loss between the user equipment UE and the base station device eNB.

That is, in the calculation of the above-mentioned path loss, the position of an antenna of a base station device which communicates using the first carrier may be different from the position of an antenna of a base station device which communicates using the second carrier.

In this way, for example, in relation to the path loss of the first carrier and the path loss of the second carrier between the user equipment UE and the base station device eNB, even when the path loss of the second carrier is large and the simultaneous communication instruction unit 14 determines that the "Carrier aggregation" is not possible, if the path loss of the first carrier between the user equipment UE and a base station device, other than the base station device eNB, is small, it is possible to perform the "Carrier aggregation".

Furthermore, when the downlink resource assignment unit 11 assigns a radio resource in the first carrier to a user equipment UE capable of simultaneously communicating through the first carrier and the second carrier, the simultaneous communication instruction unit 14 may also be configured to notify that the simultaneous communication through the first carrier and the second carrier is not possible (OFF).

Furthermore, when the uplink resource assignment unit 12 assigns a radio resource in the second carrier to the user equipment UE capable of simultaneously communicating of the first carrier and the second carrier, the simultaneous communication instruction unit 14 may also be configured to notify that the simultaneous communication through the first carrier and the second carrier is not possible (OFF).

Furthermore, the simultaneous communication instruction unit 14 notifies the downlink resource assignment unit 11, the uplink resource assignment unit 12, the downlink signal transmission unit 15, and the uplink signal transmission instruction unit 16 of a determination regarding whether to simultaneously communicate using a plurality of carriers.

The downlink signal transmission unit 15 includes a first carrier downlink signal transmission unit 15*a* and a second carrier downlink signal transmission unit 15*b*.

The first carrier downlink signal transmission unit 15*a* is configured to transmit a downlink signal in the first carrier to a user equipment UE, and the second carrier downlink signal transmission unit 15*b* is configured to transmit a downlink signal in the second carrier to the user equipment UE.

In addition, the downlink signal, for example, may be the downlink shared channel signal, the downlink data channel signal, the downlink control channel signal, the downlink control signal for instructing uplink transmission, the downlink control signal for notifying downlink transmission, the paging signal, or the DCCH.

In detail, the first carrier downlink signal transmission unit 15*a* may also be configured to determine whether to transmit the downlink signal in the first carrier based on whether a second carrier uplink signal reception unit 17*b* receives an uplink signal in the second carrier.

Here, the uplink signal, for example, is at least one of the uplink shared channel signal, the uplink data channel signal, the uplink control channel signal, the control signal for notifying a downlink channel state, the transmission acknowledgement information on a downlink shared channel signal, the scheduling request, the reference signal for sounding, the random access channel signal, the uplink signal to which the Semi-persistent Scheduling is applied, the transmission acknowledgement information on a downlink signal to which the Semi-persistent Scheduling is applied, and the dedicated control channel (DCCH: Dedicated Control Channel).

For example, the first carrier downlink signal transmission unit 15*a* may also be configured not to transmit the downlink signal in the first carrier at the time frame at which the second carrier uplink signal reception unit 17*b* receives the uplink signal in the second carrier, and may also be configured to transmit the downlink signal in the first carrier at the time frame at which the second carrier uplink signal reception unit 17*b* does not receive the uplink signal in the second carrier.

Furthermore, the second carrier downlink signal transmission unit 15*b* may also be configured to recognize non-transmission of the downlink signal in the first carrier by the first carrier downlink signal transmission unit 15*a* at the time frame at which the second carrier uplink signal reception unit 17b receives the uplink signal in the second carrier, and transmit the downlink signal in the second carrier.

Furthermore, the time frame, for example, may also be called a subframe or TTI (Transmission Time Interval). Furthermore, for example, the length of the time frame may also be 1 ms.

Furthermore, the first carrier downlink signal transmission unit 15a and the second carrier downlink signal transmission unit 15b may also be configured to determine whether to perform the simultaneous transmission (that is, "Carrier aggregation") of the downlink signal in the first carrier and the downlink signal in the second carrier based on whether the second carrier uplink signal reception unit 17b receives the uplink signal in the second carrier.

For example, the first carrier downlink signal transmission unit 15a and the second carrier downlink signal transmission unit 15b may also be configured not to simultaneously transmit the downlink signal in the first carrier and the downlink signal in the second carrier at the time frame at which the second carrier uplink signal reception unit 17b receives the uplink signal in the second carrier, and may also be configured to simultaneously transmit the downlink signal in the first carrier and the downlink signal in the second carrier at the time frame at which the second carrier uplink signal reception unit 17b does not receive the uplink signal in the second carrier.

Moreover, the first carrier downlink signal transmission unit 15a may also be configured to determine whether to transmit the downlink signal in the first carrier based on whether a first carrier uplink signal reception unit 17a and the second carrier uplink signal reception unit 17b simultaneously receive the uplink signal in the first carrier and the uplink signal in the second carrier.

For example, the first carrier downlink signal transmission unit 15a may also be configured not to transmit the downlink signal in the first carrier at the time frame at which the first carrier uplink signal reception unit 17a and the second carrier uplink signal reception unit 17b simultaneously receive the uplink signal in the first carrier and the uplink signal in the second carrier, and may also be configured to transmit the downlink signal in the first carrier at the time frame at which the first carrier uplink signal reception unit 17a and the second carrier uplink signal reception unit 17b do not simultaneously receive the uplink signal in the first carrier and the uplink signal in the second carrier.

Moreover, the first carrier downlink signal transmission unit 15a may also be configured to determine whether to perform the simultaneous transmission (that is, "Carrier aggregation") of the downlink signal in the first carrier and the downlink signal in the second carrier based on whether the first carrier uplink signal reception unit 17a and the second carrier uplink signal reception unit 17b simultaneously receive the uplink signal in the first carrier and the uplink signal in the second carrier.

For example, the first carrier downlink signal transmission unit 15a may also be configured not to simultaneously transmit the downlink signal in the first carrier and the downlink signal in the second carrier at the time frame at which the first carrier uplink signal reception unit 17a and the second carrier uplink signal reception unit 17b simultaneously receive the uplink signal in the first carrier and the uplink signal in the second carrier, and may also be configured to simultaneously transmit the downlink signal in the first carrier and the downlink signal in the second carrier at the time frame at which the first carrier uplink signal reception unit 17a and the second carrier uplink signal reception unit 17b do not simultaneously receive the uplink signal in the first carrier and the uplink signal in the second carrier.

Furthermore, the first carrier downlink signal transmission unit 15a may also be configured to determine whether to transmit the downlink signal in the first carrier based on at least one of transmission power, a transmission bandwidth, a modulation scheme, a transmission frequency, an MCS level, and a desired SIR of the uplink signal in the second carrier, in addition to whether the second carrier uplink signal reception unit 17b receives the uplink signal in the second carrier.

For example, the first carrier downlink signal transmission unit 15a may also determine not to transmit the downlink signal in the first carrier when the second carrier uplink signal reception unit 17b receives the uplink signal in the second carrier at the time frame and the transmission power of the uplink signal in the second carrier is equal to or more than a predetermined threshold value, and to transmit the downlink signal in the first carrier in other cases.

Here, the predetermined threshold value may have a value of 0 dBm as an example. Furthermore, the transmission power of the uplink signal in the second carrier, for example, may also be calculated from Power Headroom notified from a user equipment UE.

Alternatively, for example, the first carrier downlink signal transmission unit 15a may also determine not to transmit the downlink signal in the first carrier when the second carrier uplink signal reception unit 17b receives the uplink signal in the second carrier at the time frame and the transmission bandwidth of the uplink signal in the second carrier is equal to or more than a predetermined threshold value, and to transmit the downlink signal in the first carrier in other cases.

Here, the transmission bandwidth may have a value of 1 MHz or six resource blocks as an example.

Alternatively, for example, the first carrier downlink signal transmission unit 15a may also determine not to transmit the downlink signal in the first carrier when the second carrier uplink signal reception unit 17b receives the uplink signal in the second carrier at the time frame, the transmission power of the uplink signal in the second carrier is equal to or more than a predetermined first threshold value, and the transmission bandwidth of the uplink signal in the second carrier is equal to or more than a predetermined second threshold value, and to transmit the downlink signal in the first carrier in other cases.

Alternatively, for example, the first carrier downlink signal transmission unit 15a may also determine not to transmit the downlink signal in the first carrier when the second carrier uplink signal reception unit 17b receives the uplink signal in the second carrier at the time frame, the transmission power of the uplink signal in the second carrier is equal to or more than the predetermined first threshold value, the transmission bandwidth of the uplink signal in the second carrier is equal to or more than the predetermined second threshold value, and the modulation scheme of the uplink signal in the second carrier is QPSK, and to transmit the downlink signal in the first carrier in other cases.

Alternatively, for example, the first carrier downlink signal transmission unit 15a may also determine not to transmit the downlink signal in the first carrier when the second carrier uplink signal reception unit 17b receives the uplink signal in the second carrier at the time frame, the MCS level of the uplink signal in the second carrier is equal to or less than the predetermined first threshold value, and the transmission bandwidth of the uplink signal in the second carrier is equal to or more than the predetermined second threshold value, and to transmit the downlink signal in the first carrier in other cases.

Here, the first threshold value may have a value of 5 as an example when 0 to 15 are defined as the MCS level.

Furthermore, the first carrier downlink signal transmission unit 15a and the second carrier downlink signal transmission unit 15b may also be configured to determine whether to simultaneously transmit the downlink signal in the first carrier and the downlink signal in the second carrier based on at least one of the transmission power, the transmission bandwidth, the modulation scheme, the transmission frequency, the MCS level, and the desired SIR of the uplink signal in the second carrier, in addition to whether the second carrier uplink signal reception unit 17b receives the uplink signal in the second carrier.

For example, the first carrier downlink signal transmission unit 15a and the second carrier downlink signal transmission unit 15b may also determine not to simultaneously transmit the downlink signal in the first carrier and the downlink signal in the second carrier when the second carrier uplink signal reception unit 17b receives the uplink signal in the second carrier at the time frame and the transmission power of the uplink signal in the second carrier is equal to or more than a predetermined threshold value, and to simultaneously transmit the downlink signal in the first carrier and the downlink signal in the second carrier in other cases.

Here, the predetermined threshold value may have a value of 0 dBm as an example. Furthermore, the transmission power of the uplink signal in the second carrier, for example, may also be calculated from Power Headroom notified from a user equipment UE.

Alternatively, for example, the first carrier downlink signal transmission unit 15a and the second carrier downlink signal transmission unit 15b may also determine not to simultaneously transmit the downlink signal in the first carrier and the downlink signal in the second carrier when the second carrier uplink signal reception unit 17b receives the uplink signal in the second carrier at the time frame, the transmission power of the uplink signal in the second carrier is equal to or more than the predetermined first threshold value, and the transmission bandwidth of the uplink signal in the second carrier is equal to or more than the predetermined second threshold value, and to simultaneously transmit the downlink signal in the first carrier and the downlink signal in the second carrier in other cases.

Furthermore, the first carrier downlink signal transmission unit 15a may also be configured to determine whether to transmit the downlink signal in the first carrier based on at least one of the transmission power, the transmission bandwidth, the modulation scheme, the transmission frequency, the MCS level, and the desired SIR of the uplink signal in the second carrier, in addition to whether the first carrier uplink signal reception unit 17a and the second carrier uplink signal reception unit 17b simultaneously receive the uplink signal in the first carrier and the uplink signal in the second carrier.

For example, the first carrier downlink signal transmission unit 15a may also determine not to transmit the downlink signal in the first carrier when the first carrier uplink signal reception unit 17a and the second carrier uplink signal reception unit 17b simultaneously receive the uplink signal in the first carrier and the uplink signal in the second carrier at the time frame, and the transmission power of the uplink signal in the second carrier is equal to or more than a predetermined threshold value, and to transmit the downlink signal in the first carrier in other cases.

Here, the predetermined threshold value may have a value of 0 dBm as an example. Furthermore, the transmission power of the uplink signal in the second carrier, for example, may also be calculated from Power Headroom notified from a user equipment UE.

Furthermore, the first carrier downlink signal transmission unit 15a may also be configured to determine whether to transmit the downlink signal in the first carrier based on path loss between the user equipment UE and the base station device eNB, in addition to whether the second carrier uplink signal reception unit 17b receives the uplink signal in the second carrier.

Here, the first carrier downlink signal transmission unit 15a may also be configured to determine whether to transmit the downlink signal in the first carrier based on the fact that the path loss between the user equipment UE and the base station device eNB, which has been received in the simultaneous communication instruction unit 14, is equal to or more than a predetermined threshold value and thus it is determined that the simultaneous communication using a plurality of carriers is not performed.

That is, the first carrier downlink signal transmission unit 15a may also determine not to transmit the downlink signal in the first carrier when the second carrier uplink signal reception unit 17b receives the uplink signal in the second carrier at the time frame and receives the determination from the simultaneous communication instruction unit 14 that the path loss between the user equipment UE and the base station device eNB is equal to or more than the predetermined threshold value and thus the simultaneous communication using a plurality of carriers is not performed, and determine to transmit the downlink signal in the first carrier in other cases.

Furthermore, the first carrier downlink signal transmission unit 15a may also be configured to determine whether to transmit the downlink signal in the first carrier based on at least one of the transmission power, the transmission bandwidth, the modulation scheme, the transmission frequency, the MCS level, and the desired SIR of the uplink signal in the second carrier, in addition to whether the second carrier uplink signal reception unit 17b receives the uplink signal in the second carrier, and the path loss.

Furthermore, the first carrier downlink signal transmission unit 15a and the second carrier downlink signal transmission unit 15b may also be configured to determine whether to simultaneously transmit the downlink signal in the first carrier and the downlink signal in the second carrier based on the path loss between the user equipment UE and the base station device eNB, in addition whether the second carrier uplink signal reception unit 17b receives the uplink signal in the second carrier.

Here, the first carrier downlink signal transmission unit 15a and the second carrier downlink signal transmission unit 15b may also be configured to determine whether to simultaneously transmit the downlink signal in the first carrier and the downlink signal in the second carrier based on the path loss between the user equipment UE and the base station device eNB, which has been received in the simultaneous communication instruction unit 14, is equal to or more than the predetermined threshold value, and the simultaneous communication using a plurality of carriers is determined not to be performed.

That is, the first carrier downlink signal transmission unit 15a and the second carrier downlink signal transmission unit 15b may also determine not to simultaneously transmit the downlink signal in the first carrier and the downlink signal in the second carrier when the second carrier uplink signal reception unit 17b receives the uplink signal in the second carrier at the time frame and receives the determination from the simultaneous communication instruction unit 14 that the path loss between the user equipment UE and the base station device eNB is equal to or more than the predetermined threshold value and thus the simultaneous communication using a plurality of carriers is not performed, and determine to simultaneously transmit the downlink signal in the first carrier and the downlink signal in the second carrier in other cases.

Furthermore, the first carrier downlink signal transmission unit 15a and the second carrier downlink signal transmission unit 15b may also be configured to determine whether to simultaneously transmit the downlink signal in the first carrier and the downlink signal in the second carrier based on at least one of the transmission power, the transmission bandwidth, the modulation scheme, the transmission frequency, the MCS level, and the desired SIR of the uplink signal in the second carrier, in addition to whether the second carrier uplink signal reception unit 17b receives the uplink signal in the second carrier, and the path loss.

Moreover, the first carrier downlink signal transmission unit 15a may also be configured to determine whether to transmit the downlink signal in the first carrier based on the path loss between the user equipment UE and the base station device eNB, in addition to whether the first carrier uplink signal reception unit 17a and the second carrier uplink signal reception unit 17b simultaneously receive the uplink signal in the first carrier and the uplink signal in the second carrier.

The uplink transmission instruction unit 16 includes a first carrier uplink transmission instruction unit 16a and a second carrier uplink transmission instruction unit 16b.

The first carrier uplink transmission instruction unit 16a is configured to instruct the user equipment UE to transmit the uplink signal in the first carrier, and the second carrier uplink transmission instruction unit 16b is configured to instruct the user equipment UE to transmit the uplink signal in the second carrier.

In addition, a signal used for instructing the transmission of the uplink signal, for example, includes a downlink control signal (Uplink Scheduling Grant) for instructing uplink transmission. Furthermore, the uplink signal, for example, includes an uplink shared channel signal or an uplink data channel signal.

In detail, the second carrier uplink transmission instruction unit 16b may also be configured to determine whether to instruct to transmit the uplink signal in the second carrier based on whether the first carrier downlink signal transmission unit 15a transmits the downlink signal in the first carrier.

Here, the downlink signal includes at least one of the downlink shared channel signal, the downlink data channel signal, the downlink control channel signal, the downlink control signal for instructing uplink transmission, the downlink control signal for notifying downlink transmission, the transmission acknowledgement information on an uplink shared channel signal, the downlink signal to which Semi-persistent Scheduling is applied, the transmission acknowledgement information on an uplink signal to which the Semi-persistent Scheduling is applied, the paging signal, and the dedicated control channel (DCCH: Dedicated Control Channel (DCCH)).

For example, the second carrier uplink transmission instruction unit 16b may also be configured not to instruct transmission of the uplink signal in the second carrier before four time frames of the time frame at which the first carrier downlink signal transmission unit 15a transmits the downlink signal in the first carrier, and to instruct to transmit the uplink signal in the second carrier before four time frames of the time frame at which the first carrier downlink signal transmission unit 15a does not transmit the downlink signal in the first carrier.

Here, in an uplink of an LTE scheme and an LTE-A scheme, the transmission of an uplink shared channel signal or an uplink data channel signal is performed after four time frames from the time frame at which the transmission of an uplink signal in a downlink has been instructed.

Thus, as described above, whether to instruct to transmit the uplink signal in the second carrier is determined before four time frames of the time frame at which the downlink signal in the first carrier is transmitted, so that it is possible to instruct to transmit the uplink signal at the time frame at which the downlink signal is transmitted such that the transmission of the uplink shared channel signal or the uplink data channel signal does not degrade the reception characteristics of the downlink signal.

Furthermore, the first carrier uplink transmission instruction unit 16a and the second carrier uplink transmission instruction unit 16b may also be configured to determine whether to instruct to simultaneously transmit the uplink signal in the first carrier and the uplink signal in the second carrier based on whether the first carrier downlink signal transmission unit 15a transmits the downlink signal in the first carrier.

For example, the first carrier uplink transmission instruction unit 16a and the second carrier uplink transmission instruction unit 16b may also be configured not to instruct to simultaneously transmit the uplink signal in the first carrier and the uplink signal in the second carrier before four time frames of the time frame at which the first carrier downlink signal transmission unit 15a transmits the downlink signal in the first carrier, and may also be configured to instruct to simultaneously transmit the uplink signal in the first carrier and the uplink signal in the second carrier before four time frames of the time frame at which the downlink signal transmission unit 15 does not transmit the downlink signal in the first carrier.

Moreover, the second carrier uplink transmission instruction unit 16b may also be configured to determine whether to instruct to transmit the uplink signal in the second carrier based on whether the first carrier downlink signal transmission unit 15a and the second carrier downlink signal transmission unit 15b simultaneously transmit the downlink signal in the first carrier and the downlink signal in the second carrier.

For example, the second carrier uplink transmission instruction unit 16b may also be configured not to instruct to transmit the uplink signal in the second carrier before four time frames of the time frame at which the first carrier downlink signal transmission unit 15a and the second carrier downlink signal transmission unit 15b simultaneously transmit the downlink signal in the first carrier and the downlink signal in the second carrier, and may also be configured to instruct to transmit the uplink signal in the second carrier before four time frames of the time frame at which the first carrier downlink signal transmission unit 15a and the second carrier downlink signal transmission unit 15b do not simultaneously transmit the downlink signal in the first carrier and the downlink signal in the second carrier.

Moreover, the second carrier uplink transmission instruction unit 16b may also be configured to determine whether to instruct to simultaneously transmit the uplink signal in the first carrier and the uplink signal in the second carrier based on whether the first carrier downlink signal transmission unit 15a and the second carrier downlink signal transmission unit 15b simultaneously transmit the downlink signal in the first carrier and the downlink signal in the second carrier.

For example, the second carrier uplink transmission instruction unit 16b may also be configured not to instruct to simultaneously transmit the uplink signal in the first carrier and the uplink signal in the second carrier before four time frames of the time frame at which the first carrier downlink signal transmission unit 15a and the second carrier downlink signal transmission unit 15b simultaneously transmit the downlink signal in the first carrier and the downlink signal in the second carrier, and may also be configured to instruct to simultaneously transmit the uplink signal in the first carrier and the uplink signal in the second carrier before four time frames of the time frame at which the first carrier downlink signal transmission unit 15a and the second carrier downlink signal transmission unit 15b do not simultaneously transmit the downlink signal in the first carrier and the downlink signal in the second carrier.

Furthermore, the second carrier uplink transmission instruction unit 16b may also be configured to determine whether to instruct to transmit the uplink signal in the second carrier based on at least one of the transmission power, the transmission bandwidth, the modulation scheme, the transmission frequency, the MCS level, and the desired SIR of the uplink signal in the second carrier, in addition to whether the first carrier downlink signal transmission unit 15a transmits the downlink signal in the first carrier.

For example, the second carrier uplink transmission instruction unit 16b may also determine not to instruct to transmit the uplink signal in the second carrier when the first carrier downlink signal transmission unit 15a transmits the downlink signal in the first carrier at a time frame after the four time frames, and the transmission power of the uplink signal in the second carrier is equal to or more than a predetermined threshold value, and to instruct to transmit the uplink signal in the second carrier in other cases.

Here, the predetermined threshold value may have a value of 0 dBm as an example. Furthermore, the transmission power of the uplink signal in the second carrier, for example, may also be calculated from Power Headroom notified from a user equipment UE.

Alternatively, for example, the second carrier uplink transmission instruction unit 16b may also determine not to instruct to transmit the uplink signal in the second carrier when the first carrier downlink signal transmission unit 15a transmits the downlink signal in the first carrier at a time frame after the four time frames, and the transmission bandwidth of the uplink signal in the second carrier is equal to or more than a predetermined threshold value, and to instruct to transmit the uplink signal in the second carrier in other cases.

Here, the transmission bandwidth may have a value of 1 MHz or six resource blocks as an example.

Alternatively, for example, the second carrier uplink transmission instruction unit 16b may also determine not to instruct to transmit the uplink signal in the second carrier when the first carrier downlink signal transmission unit 15a transmits the downlink signal in the first carrier at a time frame after the four time frames, the transmission power of the uplink signal in the second carrier is equal to or more than a predetermined first threshold value, and the transmission bandwidth of the uplink signal in the second carrier is equal to or more than a predetermined second threshold value, and to instruct to transmit the uplink signal in the second carrier in other cases.

Alternatively, for example, the second carrier uplink transmission instruction unit 16b may also determine not to instruct to transmit the uplink signal in the second carrier when the first carrier downlink signal transmission unit 15a transmits the downlink signal in the first carrier at a time frame after the four time frames, the transmission power of the uplink signal in the second carrier is equal to or more than a predetermined first threshold value, the transmission bandwidth of the uplink signal in the second carrier is equal to or more than a predetermined second threshold value, and the modulation scheme of the uplink signal in the second carrier is QPSK, and to instruct to transmit the uplink signal in the second carrier in other cases.

Alternatively, for example, the second carrier uplink transmission instruction unit 16b may also determine not to instruct to transmit the uplink signal in the second carrier when the first carrier downlink signal transmission unit 15a transmits the downlink signal in the first carrier at a time frame after the four time frames, the MCS level of the uplink signal in the second carrier is equal to or less than a predetermined first threshold value, and the transmission bandwidth of the uplink signal in the second carrier is equal to or more than a predetermined second threshold value, and to instruct to transmit the uplink signal in the second carrier in other cases.

Here, the first threshold value may have a value of 5 as an example when 0 to 15 are defined as the MCS level. Furthermore, the second carrier uplink transmission instruction unit 16b may also be configured to determine whether to instruct to transmit the uplink signal in the second carrier based on path loss between the base station device eNB and the user equipment UE, in addition to whether the first carrier downlink signal transmission unit 15a transmits the downlink signal in the first carrier.

Here, the second carrier uplink transmission instruction unit 16b may also be configured to determine whether to instruct to transmit the uplink signal in the second carrier based on the fact that the path loss between the user equipment UE and the base station device eNB, which has been received in the simultaneous communication instruction unit 14, is equal to or more than a predetermined threshold value and thus it is determined that simultaneous communication using a plurality of carriers is not performed.

That is, the second carrier uplink transmission instruction unit 16b may also determine not to instruct to transmit the uplink signal in the second carrier when the first carrier downlink signal transmission unit 15a transmits the downlink signal in the first carrier at a time frame after the four time frames, and receives from the simultaneous communication instruction unit 14 the determination that the path loss between the user equipment UE and the base station device eNB is equal to or more than the predetermined threshold value and thus the simultaneous communication using a plurality of carriers is not performed, and determine to transmit the downlink signal in the first carrier in other cases.

Furthermore, the second carrier uplink transmission instruction unit 16b may also be configured to determine whether to instruct to transmit the uplink signal in the second carrier based on at least one of the transmission power, the transmission bandwidth, the modulation scheme, the transmission frequency, the MCS level, and the desired SIR of the uplink signal in the second carrier, in addition to whether the first carrier downlink signal transmission unit 15a transmits the downlink signal in the first carrier at a time frame after the four time frames, and the path loss.

Furthermore, the first carrier uplink transmission instruction unit 16a and the second carrier uplink transmission instruction unit 16b may also be configured to determine whether to instruct to simultaneously transmit the uplink signal in the first carrier and the uplink signal in the second carrier based on at least one of the transmission power, the transmission bandwidth, the modulation scheme, the transmission frequency, the MCS level, and the desired SIR of the uplink signal in the second carrier, in addition to whether the first carrier downlink signal transmission unit 15a transmits the downlink signal in the first carrier.

For example, the first carrier uplink transmission instruction unit 16a and the second carrier uplink transmission instruction unit 16b may also determine not to simultaneously transmit the uplink signal in the first carrier and the uplink signal in the second carrier when the first carrier downlink signal transmission unit 15a transmits the downlink signal in the first carrier at a time frame after the four time frames and the transmission power of the uplink signal in the second carrier is equal to or more than a predetermined threshold value, and to instruct to simultaneously transmit the uplink signal in the first carrier and the uplink signal in the second carrier in other cases.

Here, the predetermined threshold value may have a value of 0 dBm as an example. Furthermore, the transmission power of the uplink signal in the second carrier, for example, may also be calculated from Power Headroom notified from a user equipment UE.

Furthermore, the first carrier uplink transmission instruction unit 16a and the second carrier uplink transmission instruction unit 16b may also be configured to determine whether to instruct to simultaneously transmit the uplink signal in the first carrier and the uplink signal in the second carrier based on the path loss between the base station device eNB and the user equipment UE, in addition to whether the first carrier downlink signal transmission unit 15a transmits the downlink signal in the first carrier.

Furthermore, the second carrier uplink transmission instruction unit 16b may also be configured to determine whether to instruct to transmit the uplink signal in the second carrier based on at least one of the transmission power, the transmission bandwidth, the modulation scheme, the transmission frequency, the MCS level, and the desired SIR of the uplink signal in the second carrier, in addition to whether the first carrier downlink signal transmission unit 15a and the second carrier downlink signal transmission unit 15b simultaneously transmit the downlink signal in the first carrier and the downlink signal in the second carrier.

For example, the second carrier uplink transmission instruction unit 16b may also determine not to instruct to transmit the uplink signal in the second carrier when the first carrier downlink signal transmission unit 15a and the second carrier downlink signal transmission unit 15b simultaneously transmit the downlink signal in the first carrier and the downlink signal in the second carrier at a time frame after four time frames, and the transmission power of the uplink signal in the second carrier is equal to or more than a predetermined threshold value, and to instruct to transmit the uplink signal in the second carrier in other cases.

Here, the predetermined threshold value may have a value of 0 dBm as an example. Furthermore, the transmission power of the uplink signal in the second carrier, for example, may also be calculated from Power Headroom notified from a user equipment UE.

Alternatively, for example, the second carrier uplink transmission instruction unit 16b may also determine not to instruct to transmit the uplink signal in the second carrier when the first carrier downlink signal transmission unit 15a and the second carrier downlink signal transmission unit 15b simultaneously transmit the downlink signal in the first carrier and the downlink signal in the second carrier at a time frame after four time frames, and the transmission bandwidth of the uplink signal in the second carrier is equal to or more than a predetermined threshold value, and to instruct to transmit the uplink signal in the second carrier in other cases.

Here, the transmission bandwidth may have a value of 1 MHz or six resource blocks as an example.

Alternatively, for example, the second carrier uplink transmission instruction unit 16b may also determine not to instruct to transmit the uplink signal in the second carrier when the first carrier downlink signal transmission unit 15a and the second carrier downlink signal transmission unit 15b simultaneously transmit the downlink signal in the first carrier and the downlink signal in the second carrier at a time frame after four time frames, the transmission power of the uplink signal in the second carrier is equal to or more than a predetermined first threshold value, and the transmission bandwidth of the uplink signal in the second carrier is equal to or more than a predetermined second threshold value, and to instruct to transmit the uplink signal in the second carrier in other cases.

Moreover, the second carrier uplink transmission instruction unit 16b may also be configured to determine whether to instruct to transmit the uplink signal in the second carrier based on the path loss between the user equipment UE and the base station device eNB, in addition to whether the first carrier downlink signal transmission unit 15a and the second carrier downlink signal transmission unit 15b simultaneously transmit the downlink signal in the first carrier and the downlink signal in the second carrier.

Here, the second carrier uplink transmission instruction unit 16b may also be configured to determine whether to instruct to transmit the uplink signal in the second carrier based on the fact that the path loss between the user equipment UE and the base station device eNB, which has been received in the simultaneous communication instruction unit 14, is equal to or more than a predetermined threshold value and thus it is determined that simultaneous communication using a plurality of carriers is not performed.

That is, the second carrier uplink transmission instruction unit 16b may also determine not to instruct to transmit the uplink signal in the second carrier when the first carrier downlink signal transmission unit 15a and the second carrier downlink signal transmission unit 15b simultaneously transmit the downlink signal in the first carrier and the downlink signal in the second carrier at a time frame after four time frames, and receive the determination from the simultaneous communication instruction unit 14 that the path loss between the user equipment UE and the base station device eNB is equal to or more than a predetermined threshold value and thus the simultaneous communication using a plurality of carriers is not performed, and determine to transmit the uplink signal in the second carrier in other cases.

Furthermore, the second carrier uplink transmission instruction unit 16b may also be configured to determine whether to instruct to transmit the uplink signal in the second carrier based on at least one of the transmission power, the transmission bandwidth, the modulation scheme, the transmission frequency, the MCS level, and the desired SIR of the uplink signal in the second carrier, in addition to whether the first carrier downlink signal transmission unit 15a and the second carrier downlink signal transmission unit 15b simultaneously transmit the downlink signal in the first carrier and the downlink signal in the second carrier at a time frame after four time frames, and the path loss.

The uplink signal reception unit 17 includes the first carrier uplink signal reception unit 17a and the second carrier uplink signal reception unit 17b.

The first carrier uplink signal reception unit 17a is configured to receive the uplink signal in the first carrier transmitted from a user equipment UE, and the second carrier uplink signal reception unit 17b is configured to receive the uplink signal in the second carrier.

The measurement instruction unit 18 is configured to instruct, to the user equipment UE, a carrier in which a measurement process (Measurement) is performed. Here, the measurement process (Measurement), for example, may include a process for measuring received power of a downlink reference signal.

Here, the received power of a downlink reference signal may also be called RSRP (Reference Signal Received Power). Furthermore, the measurement process may also include a cell search process for detecting a downlink cell using a synchronization signal.

Furthermore, in the measurement process, RSRQ (Reference Signal Received Quality), SIR, or CQI may also be measured, in addition to the RSRP.

Here, the RSRQ (Reference Signal Received Quality) is obtained by dividing the received power of a downlink reference signal by RSSI (Received Signal Strength Indicator) of a downlink.

Here, the RSSI indicates the total reception level observed in a mobile station, and indicates a reception level including all of thermal noise, interference power from another cell, power of a desired signal from an own cell, and the like.

Furthermore, the CQI (Channel Quality Indicator) indicates downlink radio quality information.

Here, the measurement instruction unit 18 may also be configured to instruct a user equipment to perform a measurement process (Measurement) in the second carrier.

In this case, even when radio communication is performed between the user equipment UE and the base station device eNB using the first carrier and the second carrier, the user equipment performs the measurement process (Measurement) in the second carrier.

Furthermore, for example, the measurement instruction unit 18 may also be configured to give an instruction for performing the measurement process (Measurement) in the second carrier based on path loss between the user equipment UE and the base station device eNB.

That is, the measurement instruction unit 18 may also be configured to instruct the user equipment to perform the measurement process (Measurement) in the second carrier when the path loss is equal to or more than a predetermined threshold value, and to instruct the user equipment to perform the measurement process (Measurement) in the first carrier or both the first carrier and the second carrier in other cases.

In addition, in the above-mentioned example, the carrier, in which the measurement is to be performed, is determined based on the path loss. However, instead, the carrier, in which the measurement is to be performed, may also be determined based on at least one of the transmission power, the transmission bandwidth, the modulation scheme, the transmission frequency MCS level, and the desired SIR of the uplink signal.

Moreover, for example, the measurement instruction unit 18 may also be configured to instruct a user equipment UE capable of simultaneously communicating through the first carrier and the second carrier, that is, a user equipment UE having "Capability" of "Carrier aggregation", to perform the measurement in the second carrier, and may also be configured to instruct a user equipment UE which may not simultaneously communicate through the first carrier and the second carrier, that is, a user equipment UE having no "Capability" of the "Carrier aggregation", to perform the measurement in the first carrier.

Furthermore, the measurement instruction unit 18 may also be configured to instruct a user equipment to perform the measurement process (Measurement) in both the first carrier and the second carrier. In this case, as will be described later, the Measurement of the first carrier is performed in the user equipment UE such that the influence of the uplink signal of the second carrier is not affected.

As illustrated in FIG. 3, the user equipment UE according to the present embodiment includes a control signal reception unit 21, a measurement report transmission unit 22A, a measurement unit 22B, a control signal transmission unit 23, an uplink signal transmission unit 24, and a downlink signal reception unit 25.

The control signal reception unit 21 is configured to receive the downlink control channel signal (PDCCH: Physical Downlink Control Channel) transmitted by the base station device eNB.

Here, the downlink control channel signal includes a downlink control signal for instructing uplink transmission or a downlink control signal for notifying downlink transmission. The downlink control signal for instructing uplink transmission is notified to the uplink signal transmission unit 24. Furthermore, the downlink control signal for notifying downlink transmission is notified to the downlink signal reception unit 25.

The measurement unit 22B is configured to perform a measurement process (Measurement or CQI measurement) in the first carrier and the second carrier.

First, the Measurement will be described. Here, the Measurement indicates measurement of the received power (RSRP) of the downlink reference signal, measurement of the RSRQ, measurement of the SIR, and the like. The RSRP or the RSRQ may also be used for determining whether to perform a handover. Furthermore, the Measurement may also include a cell search process for detecting a cell.

For example, when only the Measurement of the second carrier has been specified from the measurement instruction unit 18 in the base station device eNB, the measurement unit 22B may also perform the Measurement of the second carrier at an arbitrary timing. In this case, even when radio communication is performed between the user equipment UE and the base station device eNB using the first carrier and the second carrier, the Measurement is performed only in the second carrier. Here, a measurement instruction from the base station device eNB, for example, may also be notified to the measurement unit 22B via the downlink signal reception unit 25. Furthermore, the measurement instruction may also be notified as a part of information included in an RRC message or a broadcast channel.

Furthermore, for example, when the Measurement of the first carrier and the Measurement of the second carrier have been instructed from the base station device eNB, the measurement unit 22B may also perform the Measurement at an arbitrary timing in relation to the Measurement of the second carrier, and perform the Measurement only at a timing, at which the uplink signal in the second carrier is not transmitted, in relation to the Measurement of the first carrier. The timing may also correspond to a time frame or a subframe.

Alternatively, for example, when the Measurement of the first carrier and the Measurement of the second carrier have been instructed from the base station device eNB, the measurement unit 22B may also perform the Measurement at an arbitrary timing in relation to the Measurement of the second carrier. In relation to the Measurement of the first carrier, the measurement unit 22B may also perform the Measurement only at the timing at which the uplink signal in the second carrier is not transmitted if the path loss between the user equipment UE and the base station device eNB is equal to or more than a predetermined threshold value, and the Measurement at an arbitrary timing if the path loss between the user equipment UE and the base station device eNB is smaller than the predetermined threshold value. The timing may also correspond to a time frame or a subframe. The measurement of the CQI may also be performed by a reference signal for CQI measurement.

A measurement result of the Measurement in the measurement unit 22B, for example, the RSRP, the RSRQ and the like, is transmitted to the measurement report transmission unit 22A.

The measurement report transmission unit 22A is configured to transmit "Measurement Report" including the measurement result (the RSRP, the RSRQ and the like) of the Measurement in the measurement unit 22B.

Furthermore, actually, the Measurement Report may also be transmitted to the base station device eNB via the uplink signal transmission unit 24.

Next, the CQI measurement will be described. Here, the CQI may also be called Channel State Indicator or Channel State Information (CST). Furthermore, the CSI may also indicate information including CQI, Rank Indicator (RI), Pre-coding Matrix Indicator, Pre-coding Matrix information (PMI), and the like.

In general, since the CQI is used for Link Adaptation of a downlink, when radio communication is performed between the user equipment UE and the base station device eNB using the first carrier and the second carrier, the CQI is measured in both the first carrier and the second carrier.

In this case, the measurement unit 22B may also perform the CQI measurement at an arbitrary timing in relation to the CQI measurement of the second carrier, and perform the CQI measurement only at a timing, at which the uplink signal in the second carrier is not transmitted, in relation to the CQI measurement of the first carrier. The timing may also correspond to a time frame or a subframe.

Alternatively, for example, in relation to the CQI measurement of the second carrier, the measurement unit 22B may also perform a CQI measurement at an arbitrary timing. In relation to the CQI measurement of the first carrier, the measurement unit 22B may also perform a CQI measurement only at the timing at which the uplink signal in the second carrier is not transmitted if the path loss between the user equipment UE and the base station device eNB is equal to or more than a predetermined threshold value, and the CQI measurement at an arbitrary timing if the path loss between the user equipment UE and the base station device eNB is smaller than the predetermined threshold value. The timing may also correspond to a time frame or a subframe. The measurement of the CQI may also be performed by a reference signal for CQI measurement.

A CQI measurement result in the measurement unit 22B is transmitted to the measurement report transmission unit 22A.

The measurement report transmission unit 22A is configured to transmit the CQI measurement result in the measurement unit 22B. In addition, actually, the CQI measurement result may also be transmitted to the base station device eNB via the uplink signal transmission unit 24. In this case, the CQI may also be mapped to an uplink control channel signal (PUCCH) or an uplink shared channel signal (PUSCH).

The control signal transmission unit 23 is configured to transmit the above-mentioned control signal for notifying the "Capability" of the user equipment UE to the base station device eNB. However, since details of the above-mentioned control signal are equal to the description of the control signal reception unit 13, description thereof will be omitted.

The uplink signal transmission unit 24 includes a first carrier uplink signal transmission unit 24a and a second carrier uplink signal transmission unit 24b.

The first carrier uplink signal transmission unit 24a is configured to transmit the uplink signal in the first carrier based on the control signal received in the control signal reception unit 21, that is, the downlink control signal for instructing uplink transmission.

Furthermore, the second carrier uplink signal transmission unit 24b is configured to transmit the uplink signal in the second carrier based on the control signal received in the control signal reception unit 21, that is, the downlink control signal for instructing uplink transmission.

The downlink signal reception unit 25 includes a first carrier downlink signal reception unit 25a and a second carrier downlink signal reception unit 25b.

The first carrier downlink signal reception unit 25a is configured to receive the downlink signal in the first carrier based on the control signal received in the control signal reception unit 21, that is, the downlink control signal for notifying downlink transmission.

Furthermore, the second carrier downlink signal reception unit 25b is configured to receive the downlink signal in the second carrier based on the control signal received in the control signal reception unit 21, that is, the downlink control signal for notifying downlink transmission.

(Operation of the Mobile Communication System According to the First Embodiment of the Present Invention)

Hereinafter, with reference to FIG. 4, the operation of the mobile communication system according to the first embodiment of the present invention will be described.

Figure 4:
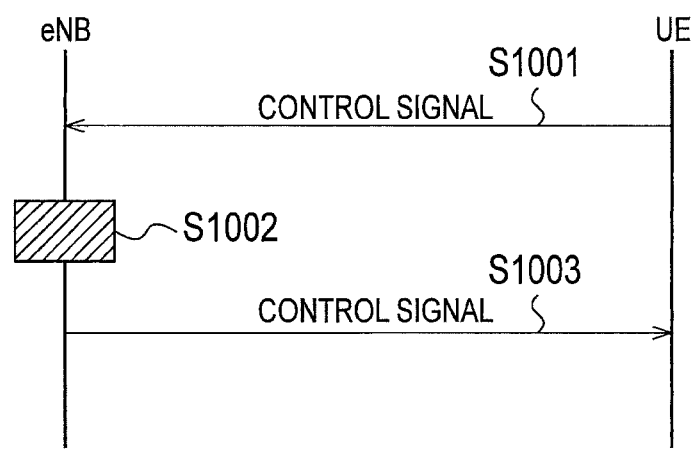
FIG. 4 is a sequence diagram illustrating an operation of the mobile communication system according to the first embodiment of the present invention.
Figure 5:
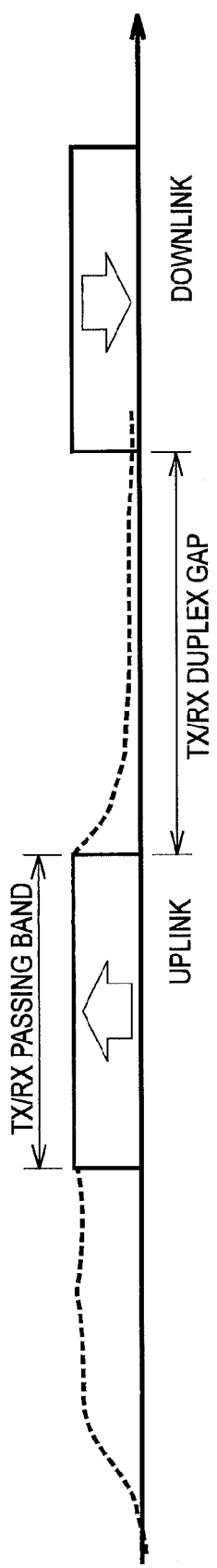
FIG. 5 is a diagram explaining problems of a conventional mobile communication system.

As illustrated in FIG. 4, in step S1001, the user equipment UE transmits a control signal to the base station device eNB, wherein the control signal includes the "Capability" of the user equipment UE, the information on simultaneously communicable carriers, and the information on a carrier capable of transmitting an uplink signal among the simultaneously communicable carriers.

In step S1002, the base station device eNB performs a scheduling process in an uplink and a downlink using the above-mentioned method based on the received control signal. Here, the scheduling process corresponds to the process in the downlink signal transmission unit 15 or the uplink transmission instruction unit 16.

In step S1003, the base station device eNB transmits a control signal including a scheduling result to the user equipment UE.

The user equipment UE to be subject to scheduling transmits an uplink signal or receives a downlink signal based on the control signal.

In addition, in the above-mentioned steps S1002 and S1003, instead of the above-mentioned process, the base station device eNB may also set an Anchor carrier using the above-mentioned method based on the received control signal in step S1002, and notify the user equipment UE of the determined Anchor carrier in step S1003.

Here, the notification of the Anchor carrier may include notification through a physical layer, notification through a MAC layer, or notification through an RRC layer. When the notification through the MAC layer is performed, the notification of the Anchor carrier may also be performed using a MAC control element.

Alternatively, in the above-mentioned steps S1002 and S1003, instead of the above-mentioned process, the base station device eNB may also assign a radio resource for a downlink signal using the above-mentioned method based on the received control signal in step S1002, and notify the user equipment UE of the determined radio resource for the downlink signal in step S1003.

Here, the notification may include notification through the physical layer, notification through the MAC layer, or notification through the RRC layer. The process for assigning the radio resource for the downlink signal corresponds to the process in the downlink resource assignment unit 11.

Alternatively, in the above-mentioned steps S1002 and S1003, instead of the above-mentioned process, the base station device eNB may also assign a radio resource for an uplink signal using the above-mentioned method based on the received control signal in step S1002, and notify the user equipment UE of the determined radio resource for the uplink signal in step S1003.

Here, the notification may include notification through the physical layer, notification through the MAC layer, or notification through the RRC layer. The process for assigning the radio resource for the uplink signal corresponds to the process in the uplink resource assignment unit 12.

Alternatively, in the above-mentioned steps S1002 and S1003, instead of the above-mentioned process, the base station device eNB may also determine a carrier, in which measurement is to be performed, using the above-mentioned method based on the received control signal in step S1002, and notify the user equipment UE of a signal for instructing the measurement in the determined carrier in step S1003.

Here, the notification may include notification through the physical layer, notification through the MAC layer, or notification through the RRC layer. The process for determining the carrier in which measurement is to be performed corresponds to the process in the measurement instruction unit 18. Furthermore, the control signal in step S1001 may also be notified to an upper node from the user equipment UE and then notified to the base station device eNB from the upper node, instead of being directly notified to the base station device eNB from the user equipment UE. The upper node may include MME (Mobility Management Entity).

Hereinafter, with reference to FIG. 11, the operation of the mobile communication system according to the first embodiment of the present invention will be described.

Figure 11:
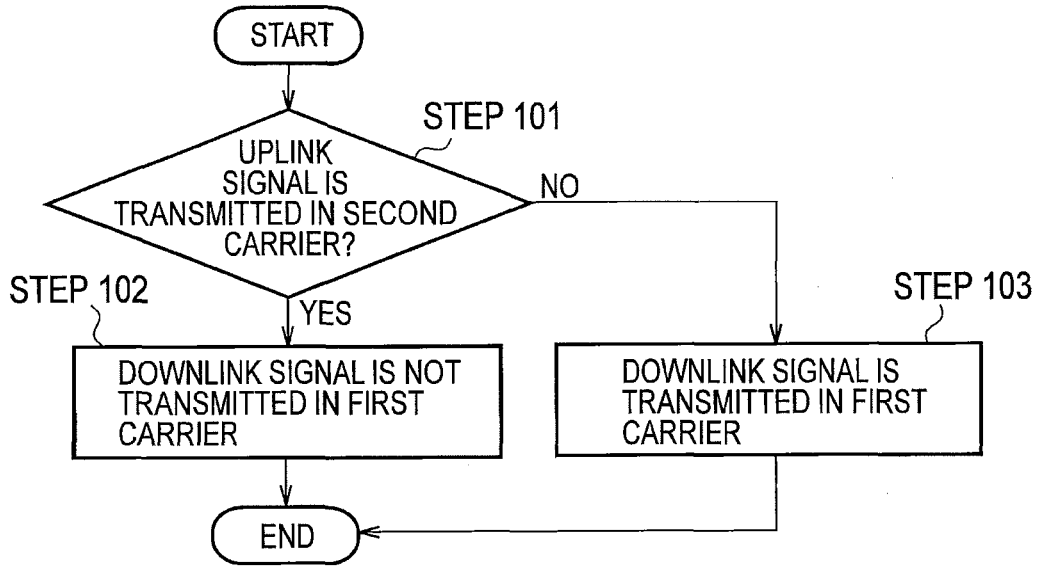
FIG. 11 is a flowchart illustrating an operation of the mobile communication system according to the first embodiment of the present invention.

As illustrated in FIG. 11, in step S101, it is determined whether the uplink signal in the second carrier is transmitted.

When the uplink signal in the second carrier is transmitted (step S101: YES), in the first carrier, the downlink signal is not transmitted in step S102.

Meanwhile, when the uplink signal in the second carrier is not transmitted (step S101: NO), in the first carrier, the downlink signal is transmitted in step S103.

In this case, since the uplink signal in the second carrier is not transmitted at the time frame at which the downlink signal in the first carrier is transmitted, it is possible to avoid the degradation of the reception characteristics of the downlink signal due to the uplink signal in the second carrier.

Figure 12:
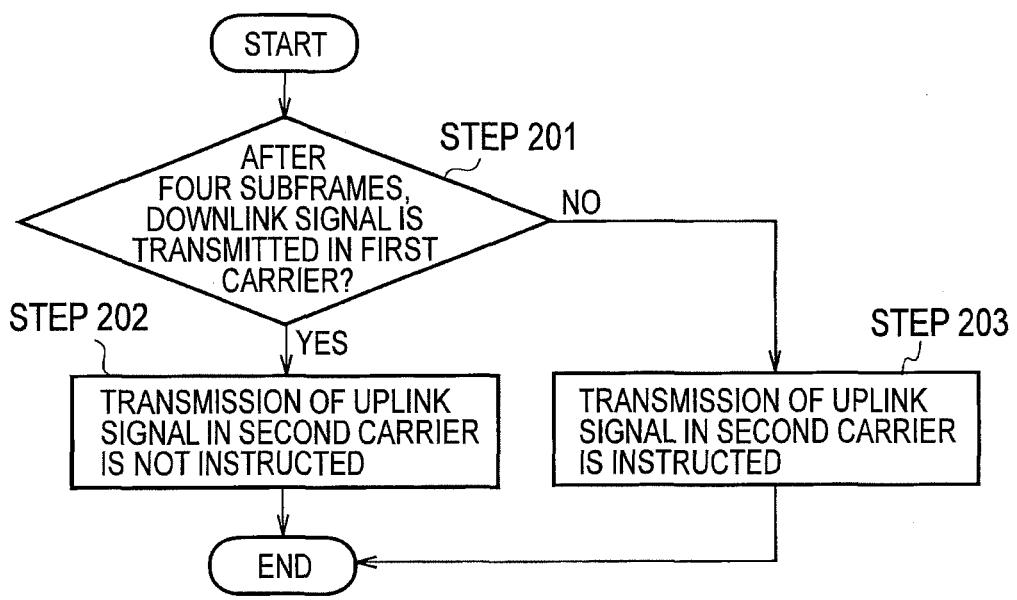
FIG. 12 is flowchart illustrating an operation of the mobile communication system according to the first embodiment of the present invention.

With reference to FIG. 12, the operation of the mobile communication system according to the first embodiment of the present invention will be described.

As illustrated in FIG. 12, in step S201, it is determined whether the downlink signal in the first carrier is transmitted after four subframes.

When the downlink signal in the first carrier is transmitted after the four subframes (step S201: YES), in step S202, it is not instructed to transmit the uplink signal in the second carrier. In this case, after the four subframes, the transmission of the uplink signal in the second carrier is not performed.

Meanwhile, when the downlink signal in the first carrier is not transmitted after the four subframes (step S201: NO), the transmission of the uplink signal in the second carrier is instructed in step S203.

In this case, since the uplink signal in the second carrier is not transmitted at the time frame at which the downlink signal in the first carrier is transmitted, it is possible to avoid the degradation of the reception characteristics of the downlink signal in the first carrier due to the uplink signal in the second carrier.

Hereinafter, with reference to FIG. 13, the operation of the mobile communication system according to the first embodiment of the present invention will be described.

As illustrated in FIG. 13, in step S301, it is determined whether the uplink signal in the second carrier is transmitted.

When the uplink signal in the second carrier is transmitted (step S301: YES), it is determined whether path loss is equal to or more than a predetermined threshold value in step S302.

When the path loss is equal to or more than the predetermined threshold value (step S302: YES), in the first carrier, the downlink signal is not transmitted in step S303.

Meanwhile, when the uplink signal in the second carrier is not transmitted (step S301: NO), or when the path loss is not equal to or more than the predetermined threshold value (step S302: NO), in step S304, the downlink signal is transmitted in the first carrier.

In this case, since the uplink signal in the second carrier is not transmitted at the time frame at which the downlink signal in the first carrier is transmitted, or even when the uplink signal in the second carrier has been transmitted, since the path loss is small and transmission power of the uplink signal in the second carrier is small, it is possible to avoid the degradation of the reception characteristics of the downlink signal in the first carrier due to the uplink signal in the second carrier.

In the above-mentioned example, whether to transmit the downlink signal in the first carrier is determined based on whether the uplink signal in the second carrier is transmitted, and the path loss. However, instead, whether to transmit the downlink signal in the first carrier may also be determined based on whether the uplink signal in the second carrier is transmitted, and the transmission power, the transmission bandwidth, the modulation scheme, the MCS level, the desired SIR and the like of the uplink signal.

Hereinafter, with reference to FIG. 14, the operation of the mobile communication system according to the first embodiment of the present invention will be described.

As illustrated in FIG. 14, in step S401, it is determined whether the downlink signal in the first carrier is transmitted after four subframes.

When the downlink signal in the first carrier is transmitted after the four subframes (step S401: YES), it is determined whether path loss is equal to or more than a predetermined threshold value in step S402.

When the path loss is equal to or more than the predetermined threshold value (step S402: YES), the transmission of the uplink signal in the second carrier is not instructed in step S403.

Meanwhile, when the downlink signal in the first carrier is not transmitted after the four subframes (step S401: NO), or when the path loss is not equal to or more than the predetermined threshold value (step S402: NO), the transmission of the uplink signal in the second carrier is instructed in step S404.

In this case, since the uplink signal in the second carrier is not transmitted at the time frame at which the downlink signal in the first carrier is transmitted, or even when the uplink signal in the second carrier has been transmitted, since the path loss is small and transmission power of the uplink signal in the second carrier is small, it is possible to avoid the degradation of the reception characteristics of the downlink signal in the first carrier due to the uplink signal in the second carrier.

In addition, in the above-mentioned example, whether to instruct to transmit the uplink signal in the second carrier is determined based on whether the downlink signal in the first carrier is transmitted after the four subframes, and the path loss. However, instead, whether to instruct to transmit the uplink signal in the second carrier may also be determined based on whether the downlink signal in the first carrier is transmitted after the four subframes, and the transmission power, the transmission bandwidth, the modulation scheme, the MCS level, the desired SIR and the like of the uplink signal.

Hereinafter, with reference to FIG. 15, the operation of the mobile communication system according to the first embodiment of the present invention will be described.

Figure 15:
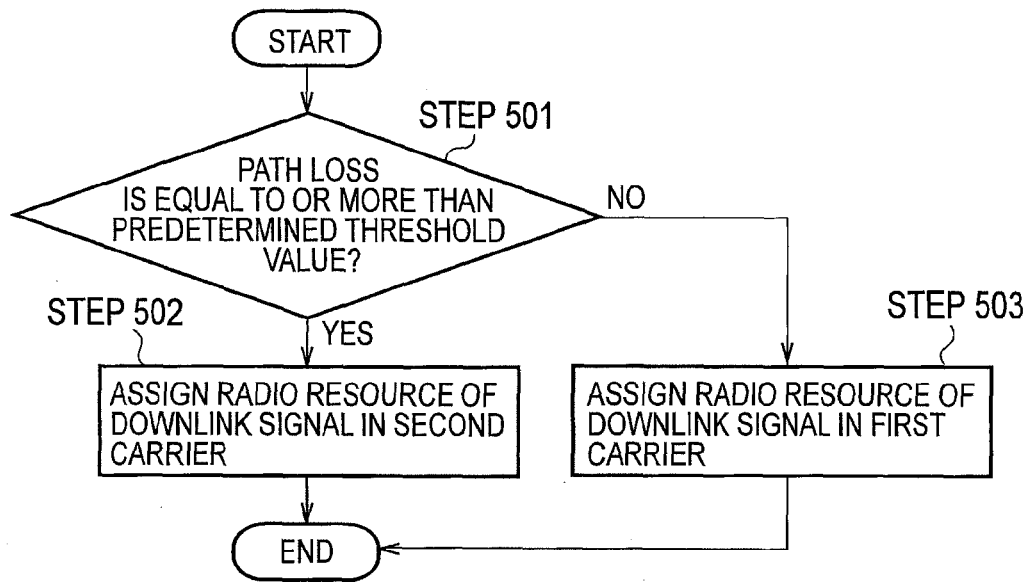
FIG. 15 is a flowchart illustrating an operation of the mobile communication system according to the first embodiment of the present invention.

As illustrated in FIG. 15, in step S501, it is determined whether path loss is equal to or more than a predetermined threshold value.

When the path loss is equal to or more than the predetermined threshold value (step S501: YES), a radio resource of the downlink signal in the second carrier is assigned in step S502.

Meanwhile, when the path loss is not equal to or more than the predetermined threshold value (step S501: NO), a radio resource of the downlink signal in the first carrier is assigned in step S503.

In this case, since a downlink signal such as PHICH or PDCCH is not affected by interference from the uplink signal in the second carrier, it is possible to avoid the degradation of the reception characteristics of the downlink signal.

In addition, in the above-mentioned example, a carrier, in which the radio resource of the downlink signal is to be assigned, is selected based on the path loss. However, instead, the carrier, in which the radio resource of the downlink signal is to be assigned, may also be selected based on the transmission power, the transmission bandwidth, the modulation scheme, the MCS level, the desired SIR and the like of the uplink signal.

Hereinafter, with reference to FIG. 16, the operation of the mobile communication system according to the first embodiment of the present invention will be described.

Figure 16:
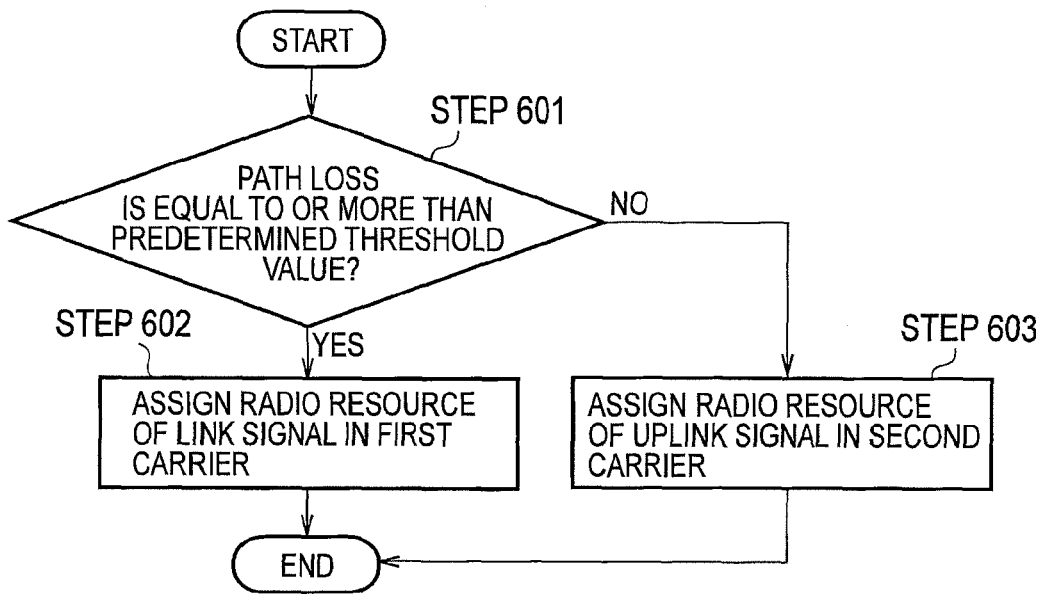
FIG. 16 is a flowchart illustrating an operation of the mobile communication system according to the first embodiment of the present invention.

As illustrated in FIG. 16, in step S601, it is determined whether or not the pass loss is equal to or more than the predetermined threshold value.

When the path loss is equal to or more than the predetermined threshold value (step S601: YES), a radio resource of the uplink signal in the first carrier is assigned in step S602.

Meanwhile, when the path loss is not equal to or more than the predetermined threshold value (step S601: NO), a radio resource of the uplink signal in the second carrier is assigned in step S603.

In this case, since an uplink signal such as PUCCH, PRACH, or a reference signal for sounding does not cause interference to the downlink signal in the first carrier, it is possible to avoid the degradation of the reception characteristics of the downlink signal.

In addition, in the above-mentioned example, a carrier, in which the radio resource of the uplink signal is to be assigned, is selected based on the path loss. However, instead, the carrier, in which the radio resource of the uplink signal is to be assigned, may also be selected based on the transmission power, the transmission bandwidth, the modulation scheme, the MCS level, the desired SIR and the like of the uplink signal.

Hereinafter, with reference to FIG. 17, the operation of the mobile communication system according to the first embodiment of the present invention will be described.

Figure 17:
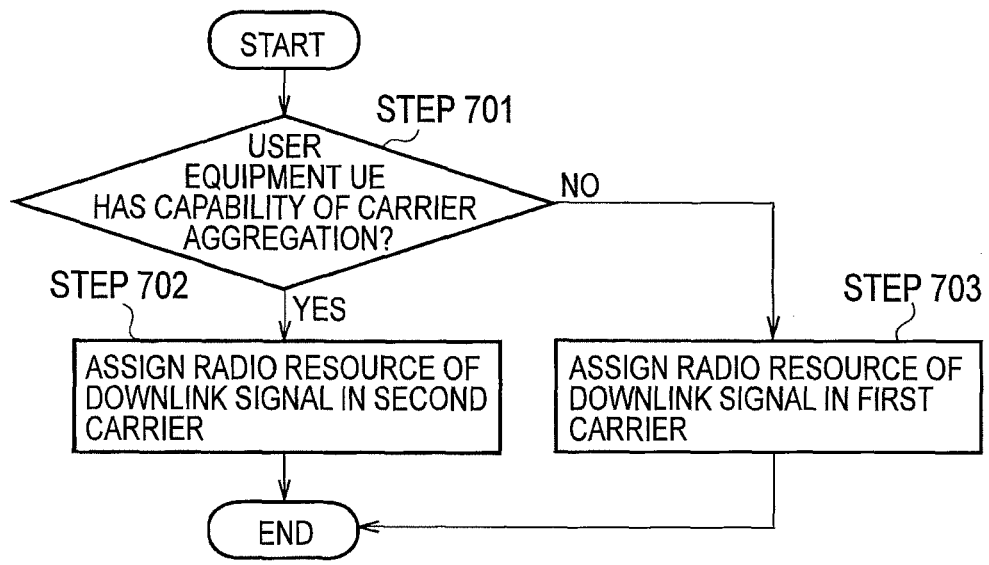
FIG. 17 is a flowchart illustrating an operation of the mobile communication system according to the first embodiment of the present invention.

As illustrated in FIG. 17, in step S701, it is determined whether the user equipment UE has the Capability of Carrier Aggregation.

When the user equipment UE has the Capability of Carrier Aggregation (step S701: YES), a radio resource of the downlink signal in the second carrier is assigned in step S702.

Meanwhile, when the user equipment UE does not have the Capability of Carrier Aggregation (step S701: NO), a radio resource of the downlink signal in the first carrier is assigned in step S703.

In this case, it is possible to distribute the radio resource of the downlink signal and to prevent the downlink signal such as PHICH or PDCCH from being affected by interference from the uplink signal in the second carrier according to whether the user equipment UE has the Carrier aggregation. In the above example, in step S702, the first carrier may be set as a primary carrier and the radio resource of the downlink signal in the first carrier may be assigned, and in step S703, communication may be set to be performed using the second carrier and the radio resource of the downlink signal in the second carrier may be assigned.

Hereinafter, with reference to FIG. 18, the operation of the mobile communication system according to the first embodiment of the present invention will be described.

Figure 18:
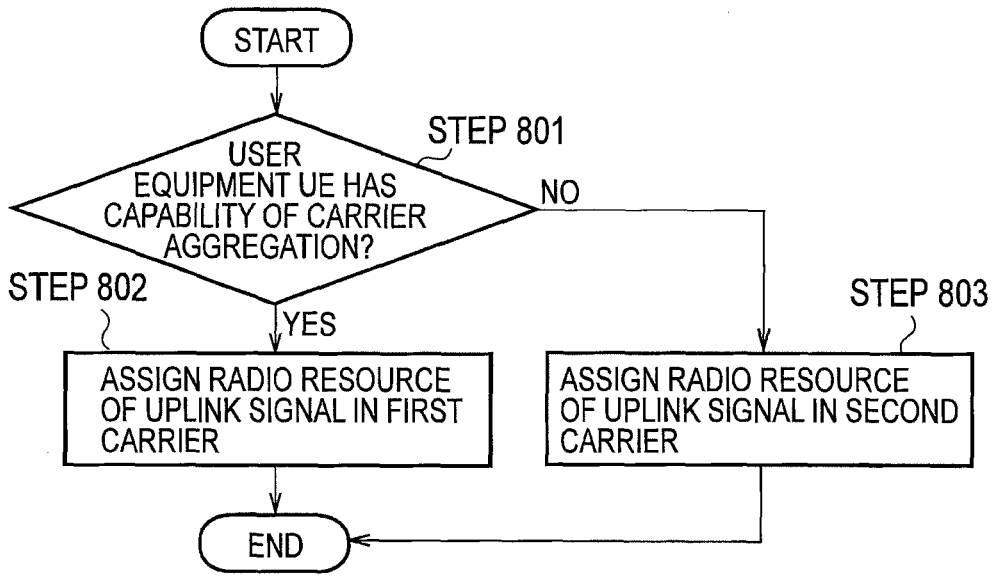
FIG. 18 is a flowchart illustrating an operation of the mobile communication system according to the first embodiment of the present invention.

As illustrated in FIG. 18, in step S801, it is determined whether the user equipment UE has the Capability of Carrier Aggregation.

When the user equipment UE has the Capability of Carrier Aggregation (step S801: YES), a radio resource of the uplink signal in the first carrier is assigned in step S802.

Meanwhile, when the user equipment UE does not have the Capability of Carrier Aggregation (step S801: NO), a radio resource of the uplink signal in the second carrier is assigned in step S803.

In this case, it is possible to distribute the radio resource of the uplink signal and to prevent the uplink signal such as PUCCH or a reference signal for sounding from causing interference to the downlink signal in the first carrier according to whether the user equipment UE has the Carrier aggregation. In the above example, in step S802, the first carrier may be set as a primary carrier and the radio resource of the uplink signal in the first carrier may be assigned, and in step S803, communication may be set to be performed using the second carrier and the radio resource of the uplink signal in the second carrier may be assigned.

Hereinafter, with reference to FIG. 19, the operation of the mobile communication system according to the first embodiment of the present invention will be described.

Figure 19:
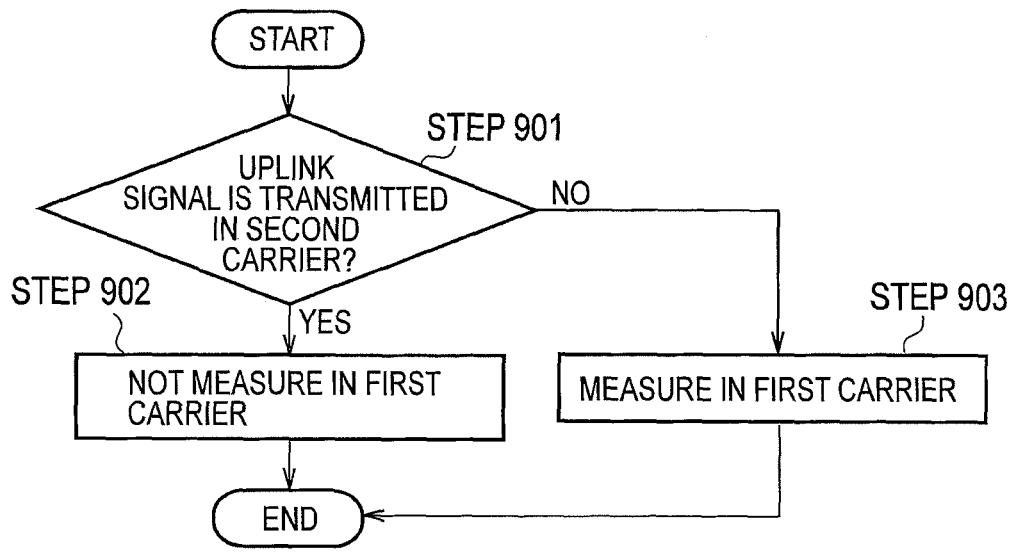
FIG. 19 is a flowchart illustrating an operation of the mobile communication system according to the first embodiment of the present invention.

As illustrated in FIG. 19, in step S901, it is determined whether the uplink signal in the second carrier is transmitted.

When the uplink signal in the second carrier is transmitted (step S901: YES), measurement in the first carrier is not performed in step S902. Here, the measurement may include measurement of CQI or Measurement of RSRP, RSRQ and the like.

Meanwhile, when the uplink signal in the second carrier is not transmitted (step S901: NO), the measurement in the first carrier is performed in step S903.

In this case, since the measurement of the first carrier is performed at the timing at which the uplink signal in the second carrier is not transmitted, it is possible to appropriately measure the first carrier.

Hereinafter, with reference to FIG. 20, the operation of the mobile communication system according to the first embodiment of the present invention will be described.

Figure 20:
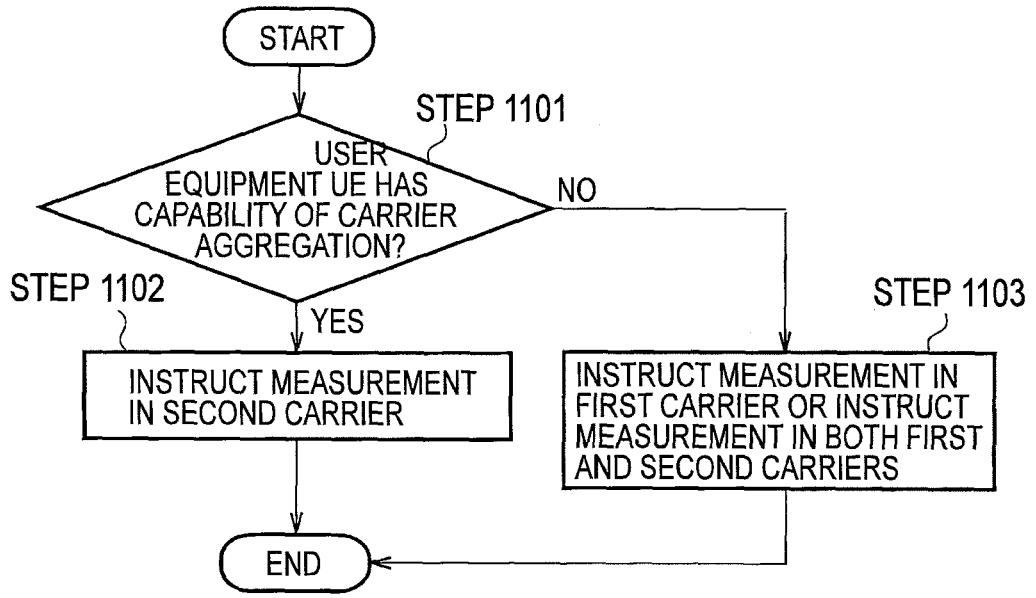
FIG. 20 is a flowchart illustrating an operation of the mobile communication system according to the first embodiment of the present invention.

As illustrated in FIG. 20, in step S1101, it is determined whether the user equipment UE has the Capability of Carrier Aggregation.

When the user equipment UE has the Capability of Carrier Aggregation (step S1101: YES), the base station device eNB instructs the user equipment UE to perform Measurement in the second carrier in step S1102. Here, the measurement may include measurement of RSRP, RSRQ and the like.

Meanwhile, when the user equipment UE does not have the Capability of Carrier Aggregation (step S1101: NO), the base station device eNB instructs the user equipment UE to perform measurement in the first carrier in step S1103. Alternatively, the base station device eNB instructs the user equipment UE to perform the measurement in both the first carrier and the second carrier.

In this case, it is possible to instruct the measurement such that the influence due to the uplink signal of the second carrier is not affected, so that it is possible to appropriately perform the measurement.

(Operation and Effect of the Mobile Communication System According to the First Embodiment of the Present Invention)

In accordance with the mobile communication system according to the first embodiment of the present invention, it is possible to measure downlink radio quality of the first carrier such that the influence of the uplink signal in the second carrier is not affected, so that it is possible to appropriately measure the downlink radio quality when multi-carrier transmission is performed.

The characteristics of the present embodiment as described above may be expressed as follows.

A first characteristic of the present embodiment is summarized in that a user equipment UE, which performs radio communication with a base station device eNB using a first carrier and a second carrier in a mobile communication system, includes a measurement unit 22B configured to perform measurement processes in the first carrier and the second carrier, wherein the measurement unit 22B is configured to perform only the measurement process in the second carrier.

In the first characteristic of the present embodiment, the measurement unit 22B may also be configured to measure at least one of a reception level, RSRP, and RSRQ of a downlink reference signal.

In the first characteristic of the present embodiment, the measurement unit 22B may also be configured to measure the downlink for a handover.

In the first characteristic of the present embodiment, the measurement unit 22B may also be configured to measure downlink channel quality information.

A second characteristic of the present embodiment is summarized in that a user equipment UE, which performs radio communication with a base station device eNB using a first carrier and a second carrier in a mobile communication system, includes a measurement unit 22B configured to perform measurement processes in the first carrier and the second carrier, wherein the measurement unit 22B is configured to perform the measurement in the first carrier only when an uplink signal in the second carrier is not transmitted.

A third characteristic of the present embodiment is summarized in that a base station device eNB, which performs radio communication with a user equipment UE using a first carrier and a second carrier in a mobile communication system, includes a downlink resource assignment unit 11 (a control signal transmission unit) configured to instruct the user equipment UE to perform measurement processes in the first carrier and the second carrier, wherein the downlink resource assignment unit 11 is configured to instruct the user equipment UE to perform only the measurement process in the second carrier.

In the third characteristic of the present embodiment, the downlink resource assignment unit 11 may also be configured to instruct downlink measurement for a handover.

A fourth characteristic of the present embodiment is summarized in that a mobile communication method, which performs radio communication between a base station device eNB and a user equipment UE using a first carrier and a second carrier in a mobile communication system, includes a step of performing measurement processes in the first carrier and the second carrier, wherein in the step, the measurement process in the first carrier is performed only when an uplink signal in the second carrier is not transmitted.

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

INDUSTRIAL APPLICABILITY

As described above, according to the present invention, it is possible to provide a user equipment, a base station device, and a mobile communication method, by which it is possible to appropriately measure a downlink radio quality when multicarrier transmission is performed.

The invention claimed is:

1. A user equipment, which performs radio communication with a base station device using a Carrier Aggregation with a first carrier and a second carrier in a mobile communication system,
wherein
a frequency band of the first carrier differs from a frequency band of the second carrier, an uplink signal and a downlink signal are transmitted in the first carrier, an uplink signal and a downlink signal are transmitted in the second carrier, the user equipment communicates using the first carrier and the second carrier simultaneously, the downlink signal in the first carrier and the uplink signal in the second carrier interfere with each other and the uplink signal in the first carrier has no interference with the downlink signal in the second carrier and the downlink signal in the first carrier, the user equipment comprising:

a measurement unit configured to perform measurement processes in the downlink signal of the second carrier, not to perform measurement process in the downlink signal of the first carrier while the uplink signal in the second carrier is transmitted and to perform measurement process in the downlink signal of the first carrier only while no interference in the downlink signal of the first carrier is detected because of no transmission in the uplink signal in the second carrier to avoid a degradation of reception characteristics of the downlink signal of the first carrier due to transmission power in the uplink signal in the second carrier, wherein the user equipment determines the time when the uplink signal of the second carrier is not transmitted.

2. The user equipment according to claim 1, wherein the measurement unit is configured to measure at least one of a reception level, Reference Signal Received Power (RSRP), and Reference Signal Received Quality (RSRQ) of a downlink reference signal.

3. The user equipment according to claim 1, wherein the measurement unit is configured to measure a downlink for a handover.

4. The user equipment according to claim 1, wherein the measurement unit is configured to measure downlink channel quality information.

5. The user equipment according to claim 1, wherein the measurement process is a process for measuring received power of a downlink reference signal.

6. A base station device, which performs radio communication with a user equipment using a Carrier Aggregation with a first carrier and a second carrier in a mobile communication system, wherein a frequency band of the first carrier differs from a frequency band of the second carrier, an uplink signal and a downlink signal are transmitted in the first carrier, an uplink signal and a downlink signal are transmitted in the second carrier, the user equipment communicates using the first carrier and the second carrier simultaneously, and the downlink signal in the first carrier and the uplink signal in the second carrier interfere with each other and the uplink signal in the first carrier has no interference with the downlink signal in the second carrier and the downlink signal in the first carrier, the base station device comprising:

a control signal transmission unit configured to, when the user equipment has a capability of carrier aggregation, instruct the user equipment to perform measurement process in the second carrier, not to instruct the user equipment to perform measurement process in the downlink signal of the first carrier while the uplink signal in the second carrier is transmitted and to instruct the user equipment to perform measurement process in the first carrier only while no interference in the downlink signal of the first carrier is detected because of no transmission in the uplink signal in the second carrier to avoid a degradation of reception characteristics of the downlink signal of the first carrier due to transmission power in the uplink signal in the second carrier, wherein the user equipment determines the time when the uplink signal of the second carrier is not transmitted.

7. The base station device according to claim 6, wherein the control signal transmission unit is configured to instruct downlink measurement for a handover.

8. The base station according to claim 6, wherein the measurement process is a process for measuring received power of a downlink reference signal.

9. A mobile communication method, which performs radio communication between a base station device and a user equipment using a first carrier and a second carrier in a mobile communication system, comprising:

a step of performing measurement processes in the first carrier and the second carrier, wherein a frequency band of the first carrier differs from a frequency band of the second carrier, a uplink signal and a downlink signal are transmitted in the first carrier, a uplink signal and a downlink signal are transmitted in the second carrier, the user equipment communicates using the first carrier and the second carrier simultaneously, and the downlink signal in the first carrier and the uplink signal in the second carrier interfere with each other and the uplink signal in the first carrier has no interference with the downlink signal in the second carrier and the downlink signal in the first carrier, in the step, the measurement process in the second carrier is performed, the measurement process in the first carrier is not performed while the uplink signal in the second carrier is transmitted and the measurement process in the first carrier is performed only during no interference in the downlink signal of the first carrier is detected because of no transmission in the uplink signal in the second carrier to avoid a degradation of reception characteristics of the downlink signal of the first carrier due transmission power in to the uplink signal in the second carrier, wherein the user equipment determines the time when the uplink signal of the second carrier is not transmitted.

10. The mobile communication method of claim 9, wherein the measurement process is a process for measuring received power of a downlink reference signal.

* * * * *